(12) United States Patent
Koura et al.

(10) Patent No.: US 11,757,949 B2
(45) Date of Patent: Sep. 12, 2023

(54) EVENT REGISTRATION SYSTEM, USER TERMINAL, AND STORAGE MEDIUM

(71) Applicants: Seiya Koura, Kanagawa (JP); Ryo Iwasaki, Tokyo (JP); Masaaki Kagawa, Tokyo (JP); Takuya Imai, Tokyo (JP); Hiromasa Koike, Tokyo (JP); Takuro Mano, Kanagawa (JP)

(72) Inventors: Seiya Koura, Kanagawa (JP); Ryo Iwasaki, Tokyo (JP); Masaaki Kagawa, Tokyo (JP); Takuya Imai, Tokyo (JP); Hiromasa Koike, Tokyo (JP); Takuro Mano, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 86 days.

(21) Appl. No.: 17/192,102

(22) Filed: Mar. 4, 2021

(65) Prior Publication Data

US 2021/0306384 A1  Sep. 30, 2021

(30) Foreign Application Priority Data

Mar. 31, 2020  (JP) .................................. 2020-064924

(51) Int. Cl.

| | | |
|---|---|---|
| *G06F 15/167* | (2006.01) | |
| *H04L 65/1073* | (2022.01) | |
| *G06Q 10/1093* | (2023.01) | |
| *H04L 65/403* | (2022.01) | |

(52) U.S. Cl.
CPC ..... *H04L 65/1073* (2013.01); *G06Q 10/1095* (2013.01); *H04L 65/403* (2013.01)

(58) Field of Classification Search
CPC .............. H04L 65/1073; H04L 65/403; G06Q 10/1095

USPC .................................................. 709/204, 217
See application file for complete search history.

(56) References Cited

U.S. PATENT DOCUMENTS

| | | | | |
|---|---|---|---|---|
| 11,495,219 B1* | 11/2022 | Srivatsa | ............ | G06Q 10/1097 |
| 2009/0192861 A1* | 7/2009 | Suzuki | ............... | G06Q 10/1095 |
| | | | | 705/7.19 |
| 2012/0151383 A1* | 6/2012 | Kazan | ..................... | H04L 67/02 |
| | | | | 715/753 |

(Continued)

FOREIGN PATENT DOCUMENTS

| | | |
|---|---|---|
| JP | 2010-219985 | 9/2010 |
| JP | 2017-127593 | 7/2017 |
| JP | 2018-063699 | 4/2018 |

OTHER PUBLICATIONS

Li, Cheng-Te, and Man-Kwan Shan. "Team formation for generalized tasks in expertise social networks." In 2010 IEEE second international conference on social computing, pp. 9-16. IEEE, 2010. (Year: 2010).*

*Primary Examiner* — Anthony Mejia
(74) *Attorney, Agent, or Firm* — IPUSA, PLLC

(57) ABSTRACT

An event registration system includes a user terminal; a storage to store organization information on one or more organizations; and circuitry configured to display, on a display, a particular participation candidate of a particular event identified based on an input from the user terminal, and a particular person based on the particular participation candidate and particular organization information of a particular organization to which the particular participation candidate belongs.

12 Claims, 34 Drawing Sheets

(56) References Cited

U.S. PATENT DOCUMENTS

| | | | |
|---|---|---|---|
| 2014/0073362 A1* | 3/2014 | Kawata | G06Q 50/01 |
| | | | 455/456.3 |
| 2014/0310132 A1* | 10/2014 | Culver | G06Q 10/101 |
| | | | 705/26.81 |
| 2015/0039368 A1* | 2/2015 | Polyakov | G06Q 50/01 |
| | | | 705/7.19 |
| 2017/0068906 A1* | 3/2017 | Korycki | G06N 20/00 |
| 2018/0018636 A1* | 1/2018 | Bisti | G06Q 10/063116 |
| 2018/0060818 A1 | 3/2018 | Ishiyama et al. | |
| 2018/0063332 A1 | 3/2018 | Ishiyama et al. | |
| 2018/0101823 A1* | 4/2018 | Nelson | G06Q 10/10 |
| 2018/0367484 A1* | 12/2018 | Rodriguez | H04L 67/75 |
| 2019/0089838 A1 | 3/2019 | Ishiyama et al. | |
| 2019/0306321 A1 | 10/2019 | Ishiyama et al. | |
| 2019/0324963 A1 | 10/2019 | Mano | |
| 2019/0327104 A1 | 10/2019 | Kagawa | |
| 2020/0034387 A1 | 1/2020 | Kagawa | |
| 2020/0175991 A1 | 6/2020 | Mano | |
| 2020/0273464 A1 | 8/2020 | Kagawa | |
| 2020/0356722 A1 | 11/2020 | Mano | |
| 2022/0343258 A1* | 10/2022 | Wilde | G06Q 10/103 |

* cited by examiner

FIG. 5

USER AUTHENTICATION MANAGEMENT TABLE

| USER ID | USER NAME | ORGANIZATION ID | PASSWORD |
|---------|-----------|-----------------|----------|
| u0001 | Taro Ricoh | o1001 | p9991 |
| u0002 | Goro Kondo | o1002 | p9992 |
| ... | ... | ... | ... |

FIG. 6

ACCESS MANAGEMENT TABLE

| ORGANIZATION ID | ACCESS ID | ACCESS PASSWORD |
|-----------------|-----------|-----------------|
| o1001 | a1001 | p1001 |
| ... | ... | ... |

FIG. 7

SCHEDULE MANAGEMENT TABLE

SCHEDULED EVENT ID: pe0001, CONDUCTED EVENT ID: ee0001

| ORGAN-IZATION ID | USER ID OF RESER-VATION HOLDER | PAR-TICIPA-TION | NAME OF RESER-VATION HOLDER | SCHED-ULED START TIME | SCHED-ULED END TIME | EVENT NAME | USER ID OF ATTENDEE/ OPTIONAL PARTICIPANT/ CONSIDERATION REQUESTED PERSON | PAR-TICIPA-TION | USER NAME OF ATTENDEE/ OPTIONAL PARTICIPANT/ CONSIDERATION REQUESTED PERSON | FILE DATA |
|---|---|---|---|---|---|---|---|---|---|---|
| o1001 | u0001 | ✓ | Taro Ricoh | 9:00 | 10:00 | Meeting on strategic plan | Attendee: u0000 | ✓ | Electronic Whiteboard | XXX.ppt YYY.xsl |
| | | | | | | | Attendee: u0002 | ✓ | Goro Kondo | |
| | | | | | | | Attendee: u0003 | ✓ | Yoshio Yamashita | |
| | | | | | | | optional participant: u0004 | | Jim Berger | |
| | | | | | | | consideration requested person: u0003 | | Taro Yamada | |

FIG. 8

CONDUCTED EVENT MANAGEMENT TABLE

| PROJECT ID | CONDUCTED EVENT ID |
|---|---|
| p0001 | ee0001, ee0011, ee0021 |
| p0002 | ee0002, ee0012 |
| ... | ... |

FIG. 9

CONTENT MANAGEMENT TABLE

CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Audio Recording | ▪Audio data URL; c://···· | 2018/1/15 9:00:00 | 2018/1/15 9:00:30 |
| c0002 | Snapshot | ▪Image data URL; c://···· | 2018/1/15 9:00:30 | 2018/1/15 9:00:30 |
| c0003 | Voice text conversion | ▪Text data URL; c://···· | 2018/1/15 9:00:00 | 2018/1/15 9:00:30 |
| ... | ... | ... | ... | ... |
| c0201 | Action item Generation | ▪Action Item ID: ai0001<br>▪User ID of execution person of action item; u0003<br>▪Due: 2018/1/30<br>▪Text data URL ; c://···· | 2018/1/15 9:44:47 | 2018/1/15 9:44:47 |
| c0202 | Audio Recording | ▪Audio data URL; c://···· | 2018/1/15 9:45:00 | 2018/1/15 9:45:30 |
| c0203 | chat | ▪Text data URL ; c://···· | 2018/1/15 9:45:30 | 2018/1/15 9:45:30 |
| c0204 | Voice text conversion | ▪Text data URL; c://···· | 2018/1/15 9:45:00 | 2018/1/15 9:45:30 |
| ... | ... | ... | ... | ... |
| c0301 | Reference transmission | ▪Reference Data; c://···· | 2018/1/15 10:00:00 | 2018/1/15 10:00:00 |

FIG. 10

USER AUTHENTICATION MANAGEMENT TABLE

| USER ID | ORGANIZATION ID | PASSWORD |
|---------|-----------------|----------|
| u0001   | o1001           | p9991    |
| u0002   | o1002           | p9992    |
| ...     | ...             | ...      |

FIG. 11

USER MANAGEMENT TABLE
ORIGINATION ID: o1001

| USER ID | USER NAME       | ORGANIZATION LEADER | ORGANIZATION LEADER OR NOT (FLAG INFORMATION) | EXPERTISE       |
|---------|-----------------|---------------------|-----------------------------------------------|-----------------|
| u0001   | Taro Ricoh      | Ichiro Riida        | No                                            | PATENT ATTORNEY |
| u0002   | Goro Kondo      | Ichiro Riida        | No                                            | ...             |
| u0003   | Yoshio Yamashita| Ichiro Riida        | No                                            | ...             |
| u0004   | Jim Berger      | Ichiro Riida        | No                                            | ...             |
| ...     |                 | ...                 | ...                                           |                 |

FIG. 12

RESOURCE MANAGEMENT TABLE

ORIGINATION ID: o1001

| RESOURCE ID | RESOURCE NAME |
|---|---|
| s1001 | Conference room X |
| s1002 | Conference room Y |
| ... | ... |

FIG. 13

RESOURCE RESERVATION MANAGEMENT TABLE

ORIGINATION ID: o1001

| RE-SOURCE ID | RESOURCE NAME | USER ID OF SHARED TERMINAL | USER ID OF RESER-VATION HOLDER | SCHEDULED USE START DATE/TIME | SCHEDULED USE END DATE/TIME | EVENT NAME |
|---|---|---|---|---|---|---|
| s1001 | Conference room X | u0000 | u0001 | 2018/1/15 9:00 | 2018/1/15 10:00 | Meeting on strategic plan |
| s1001 | Conference room X | u0000 | u0004 | 2018/1/15 10:00 | 2018/1/15 11:00 | Regular meeting |
| s1001 | Conference room X | u0000 | u0002 | 2018/1/15 10:11 | 2018/1/15 15:00 | Management meeting |
| s1002 | Conference room Y | u1000 | u0005 | 2018/1/15 9:00 | 2018/1/15 10:00 | Meeting on new product development |
| ... | ... | ... | ... | ... | ... | ... |

FIG. 14

EVENT MANAGEMENT TABLE
SCHEDULED EVENT ID: pe0001

| ORGAN-IZATION ID | USER ID | USER NAME | CATEGORY OF HOST/ATTENDEE/OPTIONAL PARTICIPANT/CONSIDERATION-REQUESTED PERSON | SCHEDULED EVENT START DATE/TIME | SCHEDULED EVENT END DATE/TIME | EVENT NAME | MEMO | FILE DATA |
|---|---|---|---|---|---|---|---|---|
| o1001 | u0000 | Electronic Whiteboard | Host | 2018/1/15 9:00 | 2018/1/15 10:00 | Meeting on strategic plan | ... | XXX.ppt YYY.xsl |
| o1001 | u0001 | Taro Ricoh | Attendee | 2018/1/15 9:00 | 2018/1/15 10:00 | Meeting on strategic plan | ... | |
| o1001 | u0002 | Goro Kondo | Attendee | 2018/1/15 9:00 | 2018/1/15 10:00 | Meeting on strategic plan | ... | |
| o1001 | u0003 | Yoshio Yamashita | Attendee | 2018/1/15 9:00 | 2018/1/15 10:00 | Meeting on strategic plan | ... | |
| o1001 | u0004 | Jim Berger | optional participant | 2018/1/15 9:00 | 2018/1/15 10:00 | Meeting on strategic plan | ... | |
| o1010 | u0100 | Taro Yamada | consideration requested person | 2018/1/15 9:00 | 2018/1/15 10:00 | Meeting on strategic plan | ... | |

FIG. 15

SERVER AUTHENTICATION MANAGEMENT TABLE

| ACCESS ID | ACCESS PASSWORD |
|---|---|
| a1001 | p1001 |
| a1002 | p1002 |
| ... | ... |

FIG. 16

PROJECT MEMBER MANAGEMENT TABLE

| ORGANIZATION ID: o1001 | | |
|---|---|---|
| PROJECT ID | PROJECT NAME | USER ID OF PROJECT MEMBER |
| p0001 | Plan for next year | u0000, u0001, u0002, u0003 |
| p0002 | R&D project | u0000, u0004, u0005 |
| p0003 | New product development | u0000, u0005, u0006, u0007 |
| ... | ... | ... |

FIG. 17

CONDUCTED EVENT RECORD MANAGEMENT TABLE

PROJECT ID: P0001 CONDUCTED EVENT ID : ee0001

| CONTENT PROCESSING ID | CONTENT PROCESSING TYPE | CONTENT DATA | START DATE/TIME | END DATE/TIME |
|---|---|---|---|---|
| c0001 | Audio Recording | ・Audio data URL; c://・・・ | 2018/1/15 9:00:00 | 2018/1/15 9:00:30 |
| c0003 | Voice text conversion | ・Text data URL; c://・・・ | 2018/1/15 9:00:00 | 2018/1/15 9:00:30 |
| c0002 | Snapshot | ・Image data URL; c://・・・ | 2018/1/15 9:00:30 | 2018/1/15 9:00:30 |
| ... | ... | ... | ... | ... |
| c0201 | Action item Generation | ・Action Item ID: ai0001<br>・User ID of excecution person of action item; u0003<br>・Due: 2018/1/30<br>・Text data URL; c://・・・ | 2018/1/15 9:44:47 | 2018/1/15 9:44:47 |
| c0202 | Audio Recording | ・Audio data URL; c://・・・ | 2018/1/15 9:45:00 | 2018/1/15 9:45:30 |
| c0204 | Voice text conversion | ・Text data URL; c://・・・ | 2018/1/15 9:45:00 | 2018/1/15 9:45:30 |
| c0203 | chat | ・Text data URL; c://・・・ | 2018/1/15 9:45:30 | 2018/1/15 9:45:30 |
| ... | ... | ... | ... | ... |
| c0301 | Reference transmission | ・Reference Data URL; c://・・・ | 2018/1/15 10:00:00 | 2018/1/15 10:00:00 |

FIG. 18

CONDUCTED EVENT MANAGEMENT TABLE

| CONDUCTED EVENT ID | EVENT NAME | START DATE/TIME | END DATE/TIME |
|---|---|---|---|
| ee0001 | Meeting on strategic plan | 2018/1/15 9:00 | 2018/1/15 10:00 |
| ee0002 | Regular meeting | 2018/1/15 10:00 | 2018/1/15 11:00 |
| ... | ... | ... | ... |

FIG. 19

PARTICIPATION CANDIDATE MANAGEMENT TABLE

| USER NAME | ORGANIZATION ID | ORGANIZATION LEADER | NUMBER OF REMARKS FOR KEYWORD |
|---|---|---|---|
| Taro Riko | o1001 | Ichiro Riida | Patent search: 10<br>Application to PO: 50<br>... |
| Goro Kondo | o1001 | Ichiro Riida | Deep learning: 5<br>Machine learning: 30<br>... |
| ... | ... | ... | ... |
| Taro Yamada | o1010 | — | 3DCAD: 50000<br>Mechanical design: 1000000<br>... |

FIG. 20

ACTION ITEM MANAGEMENT TABLE

| ACTION ITEM ID | STATE | USER ID OF EXECUTION PERSON | DUE DATE | CONTENT | ... |
|---|---|---|---|---|---|
| ai0001 | COMPLETED | u0003 | 2018/1/30 | Text data URL; http://··· | ... |
| ai0002 | NOT COMPLETED | u0002 | 2018/2/3 | Text data URL; http://··· | ... |
| ... | ... | ... | ... | ... | ... |

550 — NEW MEETING

551 — TITLE

552 — KEYWORD

553 — CONFERENCE ROOM: Conference room A

554 — START 2019/09/24 13:00  END 2019/09/24 15:00

555 — B I U S ꟷ A A̲ AA Paragraph ∨ I_x ⇐ ⇒ ≔ ⋯
Details of this new meeting is input 556 — CANDIDATE/ORGANIZATION LIST
▶ No search result

INVITE USER

558 — HOST
 557 — Taro Riko
Section: XXX

ATTENDEE

559 — SCHEDULE SETTING

560 — CLOSE

EVENT REGISTRATION SYSTEM, USER TERMINAL, AND STORAGE MEDIUM

CROSS-REFERENCE TO RELATED APPLICATION

This application claims priority pursuant to 35 U.S.C. § 119(a) to Japanese Patent Application No. 2020-064924, filed on Mar. 31, 2020 in the Japan Patent Office, the disclosure of which is incorporated by reference herein in its entirety.

BACKGROUND

Technical Field

This disclosure relates to an event registration system, a user terminal, and a storage medium.

Background Art

To select meeting participants of electronic conference, search tools can be used by a user to search candidates of meeting participants. If the user specifies one or more attributes of desired meeting participant, the search tools search and propose candidates of meeting participants satisfying the attributes.

Further, tools such as collaboration tools for assisting or supporting collaborative works performable by a group have been developed and used, in which the tools provide various functions, such as communication function and information sharing function, to a plurality of users who are working as one group or team. For example, a plurality of users who are working as one group or team in performing a collaborative work or collaboration work can use communication function, such as chat function and voice communication function, and information sharing function to hold an online meeting, and in-person meeting where the users gather at the same physical place.

To hold a meeting, such as online meeting and on-site meeting where persons physically gather at the same time or place, an organizer of the meeting needs to select participants of the meeting. However, conventional collaboration tools may be difficult to find participants who have sufficient knowledge that may be needed in the to-be-held meeting.

SUMMARY

As one aspect of the present disclosure, an event registration system is devised. The event registration system includes a user terminal; a storage to store organization information on one or more organizations; and circuitry configured to display, on a display, a particular participation candidate of a particular event identified based on an input from the user terminal, and a particular person based on the particular participation candidate and particular organization information of a particular organization to which the particular participation candidate belongs.

As another aspect of the present disclosure, a user terminal connectable to a management system for managing organization information via a network is devised. The user terminal includes circuitry configured to display, on a display, a particular participation candidate of a particular event identified based on an input to the user terminal, and a particular person based on the particular participation candidate and particular organization information of a particular organization to which the particular participation candidate belongs.

As another aspect of the present disclosure, a non-transitory computer readable storage medium storing one or more instructions that, when executed by one or more processors, cause the one or more processors to perform a method of processing information is devised. The method includes displaying, on a display, a particular participation candidate of a particular event identified based on an input to the user terminal, and a particular person based on the particular participation candidate and particular organization information of a particular organization to which the particular participation candidate belongs, the user terminal being connectable to a management system for managing organization information via a network.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 5 is an example schematic diagram of a user authentication management table;

FIG. 6 is an example of schematic diagram of an access management table;

FIG. 7 is an example of schematic diagram of a schedule management table;

FIG. 8 is an example of schematic diagram of a conducted event management table;

FIG. 9 is an example of schematic diagram of a content management table;

FIG. 10 is an example of schematic diagram of a user authentication management table;

FIG. 11 is an example of schematic diagram of a user management table;

FIG. 12 is an example of schematic diagram of a resource management table;

FIG. 13 is an example of schematic diagram of a resource reservation management table;

FIG. 14 is an example of schematic diagram of an event management table;

FIG. 15 is an example of schematic diagram of a server authentication management table;

FIG. 16 is an example of schematic diagram of a project member management table;

FIG. 17 is an example of schematic diagram of a conducted event record management table;

FIG. 18 is an example of schematic diagram of a conducted event management table;

FIG. 19 is an example of schematic diagram of a participation candidate management table;

FIG. 20 is an example of schematic diagram of an action item management table;

The accompanying drawings are intended to depict embodiments of this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments with reference to the drawings, but the present invention is not limited to embodiment described in this description. In this description, a group or team of users gathering for performing a collaborative work (or collaboration work) is referred to as a project, and each user belonging to the project is referred to as a member of project or project member. Further, in this description, "file" may indicate "electronic file".

First Embodiment (System Configuration)

Figure 1:
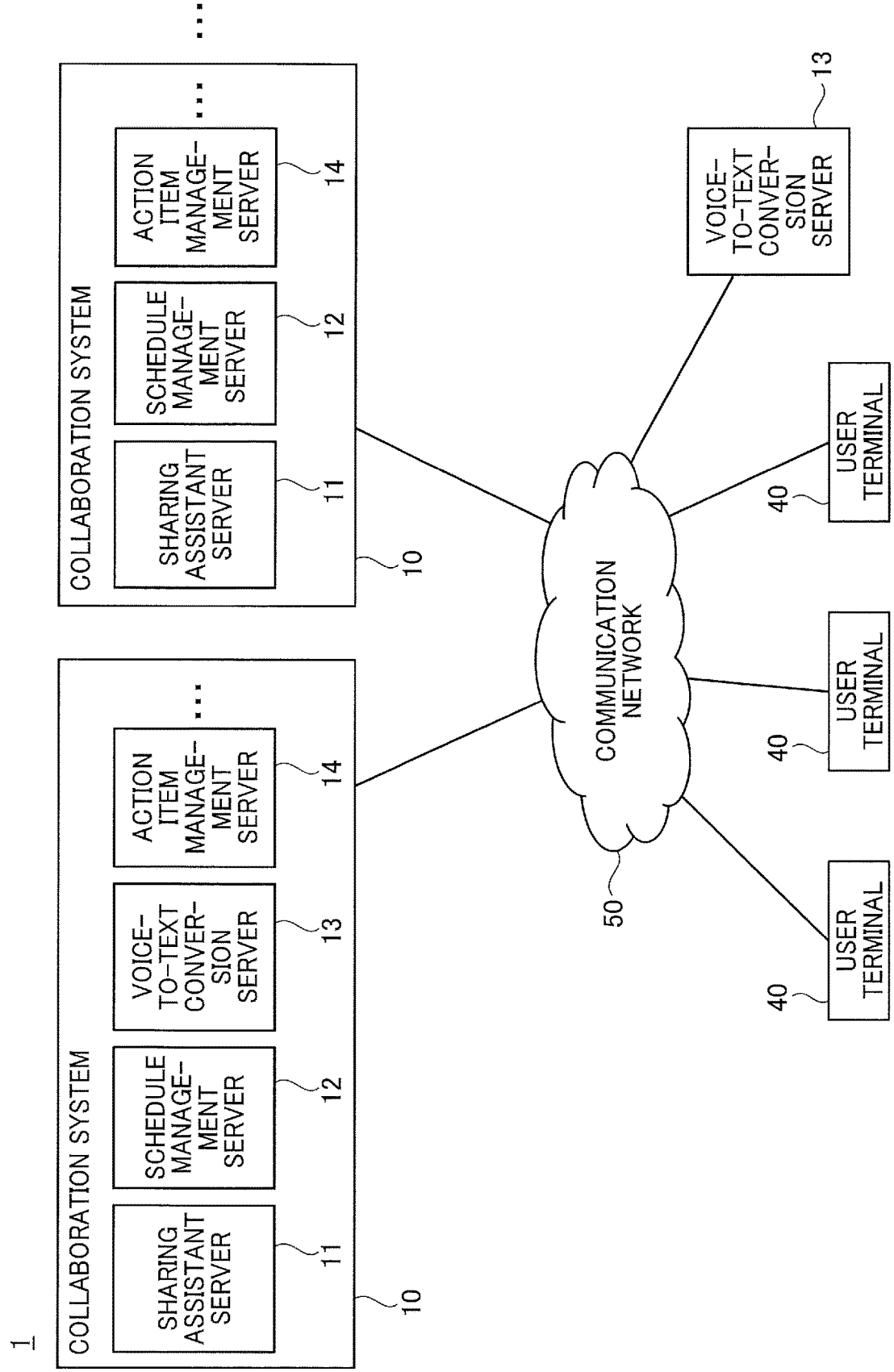
FIG. 1 is an example of system configuration of an information processing system according to a first embodiment.

FIG. 1 is an example of system configuration of an information processing system 1 according to a first embodiment. As illustrated in FIG. 1, the information processing system 1 includes, for example, a collaboration system 10, a voice-to-text conversion server 13 (or audio-to-text conversion server), and a user terminal 40 communicably connected with each other via a communication network 50.

The communication network 50 is constructed, for example, by the Internet, a mobile communication network, local area network (LAN) or the like. The communication network 50 may include not only wired communication but also a wireless communication network such as 3rd Generation (3G), Worldwide Interoperability for Microwave Access (WiMAX) or Long Term Evolution (LTE).

The collaboration system 10 is a system that assists or supports a plurality of persons or users to perform one work together. For example, the collaboration system 10 is a system that is used to perform voice call, video call, chat, screen sharing (projection), information sharing, review of agenda, preparation and compilation of reference materials, schedule setting, determination of action item, or the like, using personal computer (PC), portable terminal, electronic information board (e.g., electronic whiteboard), projector, conference tool, or the like, in a place where persons gather to discuss and share opinions, consultation, or the like for a specific purpose (including a case where persons gather at the same physical place, and a case where persons are physically separated but user terminals are connected to each other via a network).

The collaboration system 10 has the same meaning as the collaboration work assistant or supporting system. The collaboration work assistant or support system is a system that assists or supports multiple persons to do one work together. For example, the collaboration work assistant or support system provides a communication function and an information sharing function. The collaboration system 10 provides various collaboration tools to assist or support a collaborative work or collaboration work performable by project members. Each collaboration tool is a unit, function, or tool for assisting or supporting a plurality of persons who are working together to accomplish one work or job. The collaboration tools include various functions, such as communication function, scheduling function (schedule management function), information sharing function, and action item management function. The collaborative work (or collaboration work) means that a plurality of persons perform one work together.

Further, the collaboration tools provided by a plurality of collaboration systems 10 may not be the same functions. Therefore, in an example case of FIG. 1, the server configuration of the two collaboration systems 10 are different. A sharing assistant server 11 (or sharing support server 11) included in the collaboration system 10 provides various functions, such as communication function, and information sharing function, to each project member.

A schedule management server 12 included in the collaboration system 10 provides a schedule management function to each project member.

A voice-to-text conversion server 13 included in the collaboration system 10 converts voice data of each project member into text data. As illustrated in the information processing system 1 of FIG. 1, the voice-to-text conversion server 13 may be provided separately from the collaboration system 10.

An action item management server 14 included in the collaboration system 10 provides an action item management function to each project member. The action item is a work or job, which is required to be assigned and executed or conducted by one or more users.

The user terminal 40, which is an example of information processing terminal, is operated by each user, such as each project member. The user can use the collaboration system 10 from the user terminal 40.

Further, the user terminal 40 is not limited to a PC as long as the user terminal 40 has the communication function. The user terminal 40 may be, for example, projector (PJ), interactive whiteboard (IWB) having electronic board function that can communicate with each other, output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC.

Further, the sharing assistant server 11, the schedule management server 12, the voice-to-text conversion server 13, and the action item management server 14 can be implemented by, for example, one or more information processing apparatuses.

Further, the collaboration system 10 may be one or more computers, in which a part or all of the functions of the sharing assistant server 11, the schedule management server 12, the voice-to-text conversion server 13, and the action item management server 14 are integrated.

Further, one or more functions of the sharing assistant server 11, the schedule management server 12, the voice-to-text conversion server 13, and the action item management server 14 can be distributed over to a plurality of computers.

Further, the sharing assistant server 11, the schedule management server 12, the voice-to-text conversion server 13, and the action item management server 14 may be implemented by computers in a cloud environment or computers in an on-premise environment. As described above, the information processing system 1 illustrated in FIG. 1 is just one example.

Further, the collaboration system 10, the sharing assistant server 11, the schedule management server 12, the voice-to-text conversion server 13, and the action item management server 14 are not limited to PCs as long as these apparatuses have the communication function.

Further, each of the collaboration system 10, the sharing assistant server 11, the schedule management server 12, the voice-to-text conversion server 13, and the action item management server 14 may be, for example, projector (PJ), interactive whiteboard (IWB), output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC.

Further, the collaboration system 10, the sharing assistant server 11, the schedule management server 12, the voice-to-text conversion server 13, and the action item management server 14 are not limited to PCs as long as these apparatuses have the communication function.

Further, each of the collaboration system 10, the sharing assistant server 11, the schedule management server 12, the voice-to-text conversion server 13, and the action item management server 14 may be, for example, projector (PJ), interactive whiteboard (IWB), output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC.

Further, the collaboration information provided by the collaboration system 10 to each project member by the collaboration tool includes, for example, synchronous collaboration information and asynchronous collaboration information.

The synchronous collaboration information is information that is exchanged in real time in a place (e.g., meeting), in which persons gather to discuss and share opinions or consult for a specific purpose. The synchronous collaboration information is, for example, voice call, video call, and screen shared by PC/portable terminal/electronic whiteboard (including text and diagrams input from PC, portable terminal, and handwritten input contents to a screen of electronic whiteboard).

Further, the asynchronous collaboration information is information that is input or shared on the network. The asynchronous collaboration information includes, for example, information that can be shared and referenced by participants before and after an event (e.g., meeting) where persons gather to discuss and share opinions or consult for a specific purpose. The asynchronous collaboration information includes, for example, chat, message, content, scheduling, action item, content of audio recording/video recording, or the like.

These terms are included in Conference Solutions Report, "Magic Quadrant for Meeting Solution", published in September 2019, by Gartner, Inc.

(Hardware Configuration)

Figure 2:
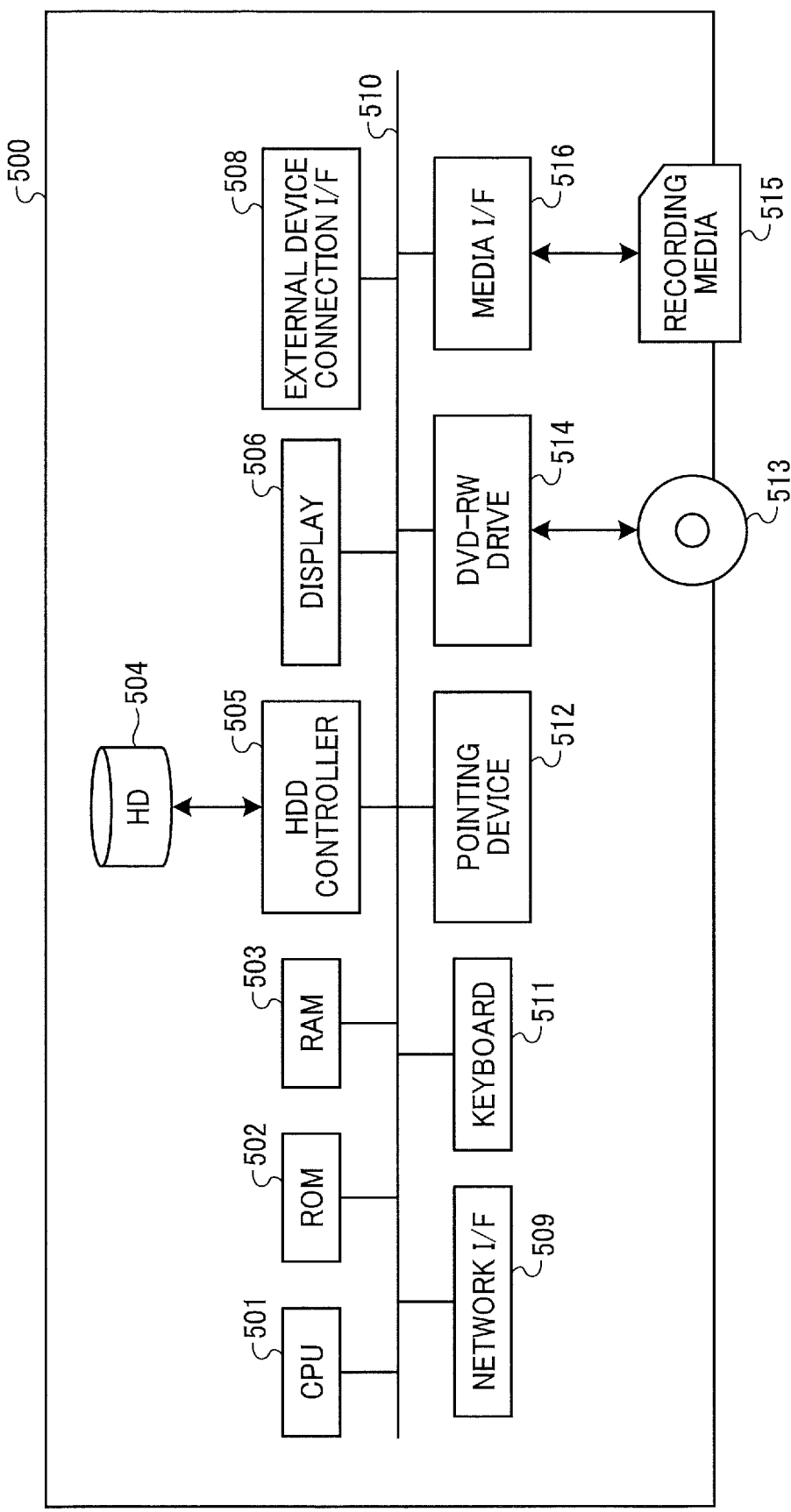
FIG. 2 is an example of hardware block diagram of a computer according to the first embodiment.

The collaboration system 10, the sharing assistant server 11, the schedule management server 12, the voice-to-text conversion server 13, the action item management server 14, and the user terminal 40 illustrated in FIG. 1 are implemented by, for example, a computer 500 having a hardware configuration illustrated in FIG. 2. FIG. 2 is an example of hardware block diagram of the computer 500 according to the first embodiment.

As illustrated in FIG. 2, the computer 500 includes, for example, a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a media I/F 516.

The CPU 501 controls the operation of the computer 500 entirely in accordance with one or more programs. The ROM 502 stores programs for driving the CPU 501, such as initial program loader (IPL). The RAM 503 is used as a work area of the CPU 501.

The HD 504 stores various data, such as programs. The HDD controller 505 controls reading or writing of various data from or to the HD 504 under the control of the CPU 501.

The display 506 displays various information, such as cursor, menu, window, characters, or image.

The external device connection I/F 508 is an interface for connecting various external devices. In this case, the external device is, for example, a universal serial bus (USB) memory or a printer. The network I/F 509 is an interface for performing data communication using the communication network 50. The bus line 510 is address bus and data bus for electrically connecting each component, such as the CPU 501 illustrated in FIG. 2.

The keyboard 511 is a type of input means including a plurality of keys for inputting characters, letters, numbers, and various instructions.

The pointing device 512 is a type of input means for selecting or executing various instructions, selecting processing target, moving a cursor, or the like. The DVD-RW drive 514 controls reading or writing of various data from or to the DVD-RW 513, which is as an example of removable recording medium. Further, the removable recording medium may be digital versatile disk recordable (DVD-R) in addition to DVD-RW. The media I/F 516 controls reading or writing of data from or to a recording medium 515, such as flash memory.

Further, each of the above described programs may be recorded on a computer-readable recording medium in an installable form or an executable form and distributed. Examples of the recording medium include compact disc recordable (CD-R), digital versatile disk (DVD), Blu-Ray (registered trademark) disc, and secure digital (SD) card. Further, the recording medium can be provided to a country or a foreign country as a program product.

(Software Configuration)

Hereinafter, with reference to FIG. 3, a description is given of software installed on the user terminal 40. The computer software (hereinafter referred to as "software") is a program related to an operation of computer and other information used for processing by the computer, which is equivalent to the program. The program is an instruction to the computer, which is a combination of instructions to obtain one result.

Further, the term of "program-equivalent" is not a program because the "program-equivalent" is not a direct command to the computer. The term of "program-equivalent" is similar to the program because the "program-equivalent" specifies the computer processing. For example, a data structure (a logical structure of data represented by a mutual relationship between data elements) is equivalent to the program.

Further, an application is a generic name of software used for performing a specific process in the software classification. On the other hand, an operating system (hereinafter referred to as OS) is a software for controlling a computer and making computer resources available to applications or the like. The OS performs basic management and control of computer such as input/output control, management of hardware such as memory and hard disk, and process management. The applications operate using the functions provided by the OS.

Figure 3:
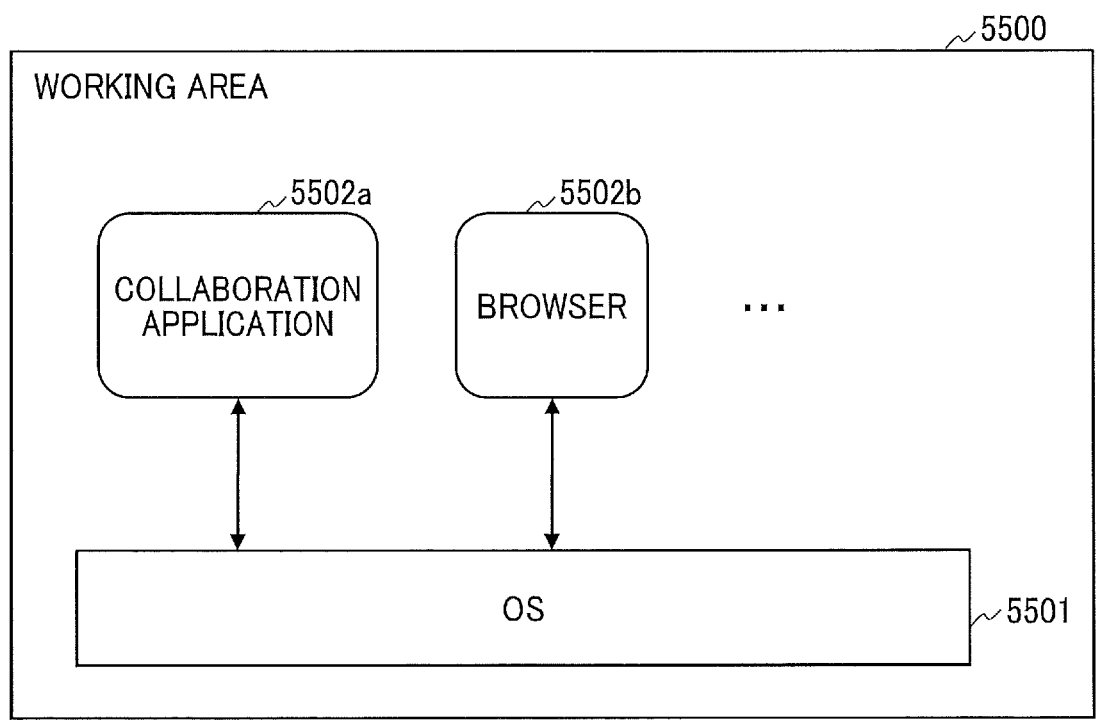
FIG. 3 is an example of software configuration of a user terminal.

FIG. 3 is an example of software configuration of the user terminal 40. As illustrated in FIG. 3, OS 5501, collaboration application 5502a, and browser 5502b operate on a work area 5500 of the RAM 503. The OS 5501 is basic software that provides basic functions of the user terminal 40, and manages the user terminal 40 entirely.

The collaboration application 5502a and the browser 5502b are external applications running on the OS 5501 (hereinafter referred to as external applications 5502 when there is no need to distinguish them from each other). The external application 5502 executes services or functions provided on the OS 5501.

The collaboration application 5502a and the browser 5502b are applications used for generating and displaying screens to be described later. The screens, to be described later, displayed by the collaboration application 5502a and the browser 5502b are created using, for example, various data transmitted from the collaboration system 10.

Although FIG. 3 indicates an example, in which two external applications, such as the collaboration application 5502a and browser 5502b are installed on the user terminal 40, but the number of external applications is not limited thereto. The number of external application 5502 installed on the user terminal 40 may be one, or two or more. Further, the external application 5502 may be downloaded and installed from, for example, a server provided in the collaboration system 10, or a server provided in the cloud or on-premises.

(Functional Configuration)

Figure 4:
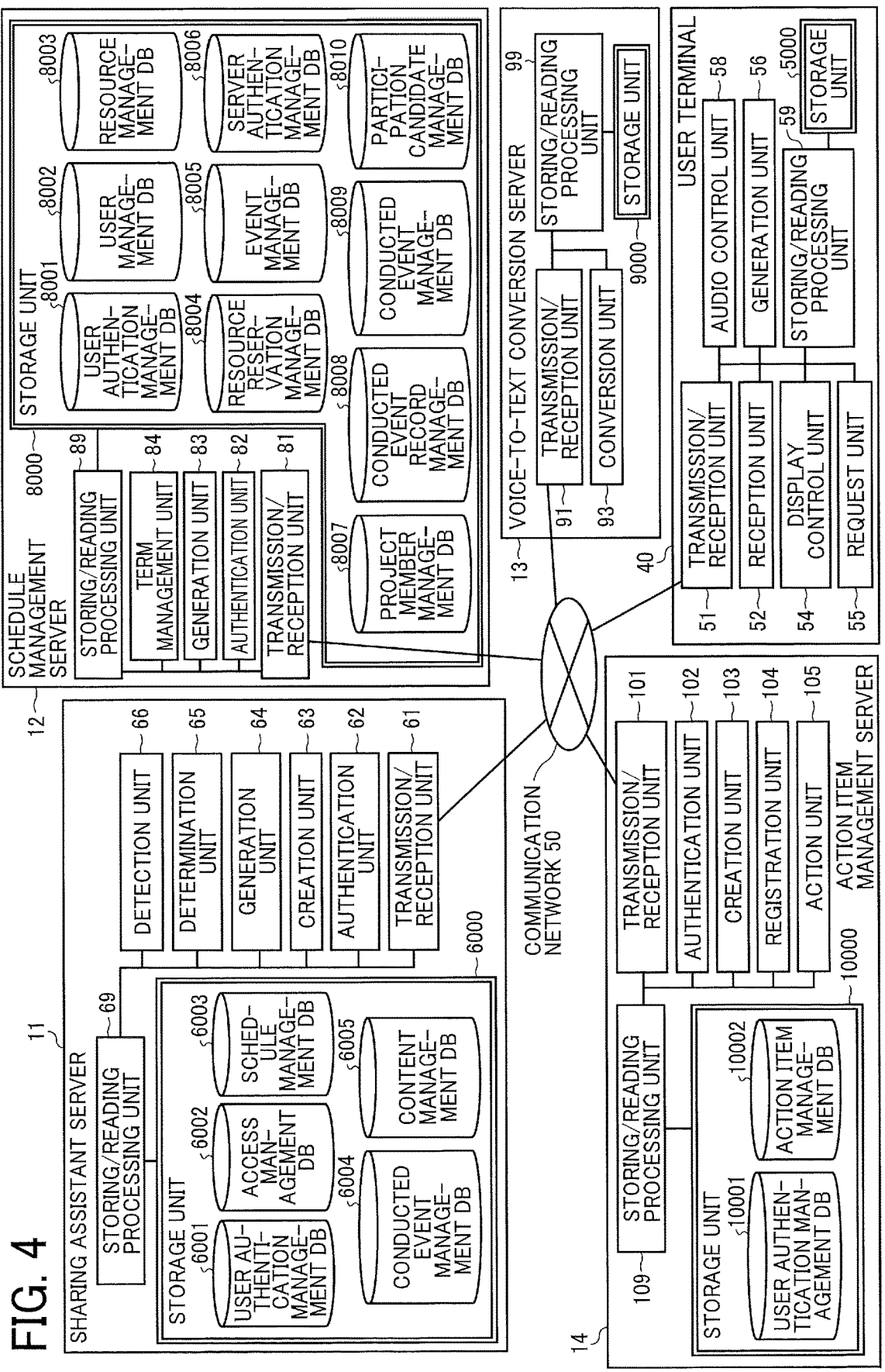
FIG. 4 is an example of functional block diagram of an information processing system according to the first embodiment.

The information processing system 1 according to the first embodiment is implemented by a functional units illustrated in FIG. 4. FIG. 4 is an example of functional block diagram of the information processing system 1 according to the first embodiment. FIG. 4 appropriately omits some functional unit not necessary for the description of the first embodiment.

(Functional Configuration of Sharing Assistant Server)

As illustrated in FIG. 4, the sharing assistant server 11 includes, for example, a transmission/reception unit 61, an authentication unit 62, a creation unit 63, a generation unit 64, a determination unit 65, a detection unit 66, and a storing/reading processing unit 69. Each of the functional units of the sharing assistant server 11 is a function or means implemented by any one of the components illustrated in FIG. 2 under the instructions from the CPU 501 executing programs loaded on the RAM 503 from the HD 504. Further, the sharing assistant server 11 includes a storage unit 6000, implemented by the HD 504 illustrated in FIG. 2.

(User Authentication Management Table)

FIG. 5 is an example of schematic diagram of a user authentication management table. The storage unit 6000 includes a user authentication management database (DB) 6001 configured by the user authentication management table illustrated in FIG. 5. The user authentication management table stores or manages user ID identifying each user, user name, organization ID identifying each organization to which each user belongs, and password in association with each other. Further, the organization ID includes a domain name representing a group or organization managing a plurality of computers connected on the communication network 50.

(Access Management Table)

FIG. 6 is an example of schematic diagram of an access management table. The storage unit 6000 includes an access management DB 6002 configured by the access management table illustrated in FIG. 6. The access management table stores or manages organization ID, access ID, and access password required for authentication when accessing the schedule management server 12 in association with each other. The access ID and access password are required for the sharing assistant server 11 to use a service or function provided by the schedule management server 12 via a web application programming interface (WebAPI) or the like using a given protocol, such as Hypertext Transfer Protocol (HTTP) or Hypertext Transfer Protocol Secure (HTTPS).

The schedule management server 12 stores and manages a plurality of schedulers. Since different organizations may use different schedulers, the management using the access management table illustrated in FIG. 6 is required.

(Schedule Management Table)

FIG. 7 is an example of schematic diagram of a schedule management table. The storage unit 6000 includes a schedule management DB 6003 configured by the schedule management table illustrated in FIG. 7. The schedule management table stores or manages organization ID, user ID of reservation holder, participation or absence of reservation holder, reservation holder name (user name), scheduled start time, scheduled end time, event name, user ID of attendee/optional participant/consideration-requested person, participation or absence of attendee/optional participant/consideration-requested person, user name of attendee/optional participant/consideration-requested person, and file data in association with each other for each scheduled event ID and conducted event ID.

The scheduled event ID is identification information identifying each scheduled or reserved event. The event is a place where persons gather directly or via the communication network 50 and provides opinions, presentations, consultations, or the like for a specific purpose, such as conference, meeting, public gathering, private gathering, consultation, in-person meeting, larger conference, seminar, webinar (online seminar), academic workshop, policy presentation, or the like. The scheduled event ID is an example of scheduled event identification information identifying each event to be conducted.

The conducted event ID is identification information identifying each event that was actually conducted or each event that is being conducted among the scheduled or reserved events.

The conducted event ID is an example of conducted event identification information identifying each conducted event or each being-conducted event.

The reservation holder name is a name of a person who has reserved a shared resource, such as a conference room. The shared resource is an object, service, space (room), place, or information that can be used by a plurality of persons or a group. The conference room is an example of shared resource that is shared by a plurality of users. If the shared resource is a conference room, the reservation holder name is, for example, a name of organizer or host.

The scheduled start time indicates a scheduled use start time of shared resource. The scheduled end time indicates a scheduled use end time of shared resource. The event name indicates a name of each event scheduled to be conducted by the reservation holder.

Hereinafter, the shared resource may be simply referred to as the "resource" to simplify the expression in this description.

The user ID of attendee/optional participant/consideration-requested person is a user ID of user selected as attendee of event, a user ID of user selected as optional participant of event, and a user ID of user selected as consideration-requested person of event.

The attendee of event is a user who are required to participate an event.

The optional participant of event is a user who is not required to participate an event, but may be requested to participate depending on discussion during an online meeting.

The consideration-requested person of event is a user who receives a request to examine or review participation of attendee and optional participant to one or more events. The consideration-requested person examines or reviews a user who should be added as attendee or optional participant of event, and a user who should be deleted from attendee or optional participant of event. The consideration-requested person may be, for example, a person or user (e.g., supervisor, colleague, subordinate) of the same organization of attendee or optional participant of event, or may be a person or user of different organization. Hereinafter, the event may mean one or more events.

The file data is file data of reference file to be used in each event corresponding to the scheduled event ID registered by a user. The file data is data that is created using various applications and a given file format. The file format of file data is, for example, a file for presentation software, a file for spread sheet software, or the like.

(Conducted Event Management Table)

FIG. 8 is an example of schematic diagram of a conducted event management table. The storage unit 6000 includes a conducted event management DB 6004 configured by the conducted event management table illustrated in FIG. 8. The conducted event management table stores or manages conducted event ID in association with each project ID.

The project ID is identification information identifying each project (e.g., project identification information). The project represents a group, team, or grouping of users configured to achieve a particular goal, plan, project, or the like.

Members belonging to the same project can share the minutes of event associated with the project ID as conducted event record. The shared data indicates various information that was used during an event (e.g., online meeting), and includes, for example, files, image data of shared screen, recorded video data, recorded audio data, stroke data, pointer data, chat data, or the like.

The project ID is allocated to each project. Further, the project ID may be also referred to as group ID or team ID.

(Content Management Table)

FIG. 9 is an example of schematic diagram of a content management table. The storage unit 6000 includes a content management DB 6005 configured by the content management table illustrated in FIG. 9. The content management table stores or manages content processing ID, type of content processing (content processing type), material of content (content data), and start date/time and end date/time of content processing in association with each other for each conducted event ID. In this description, the date may mean day (e.g., day of month, day of week) and time (e.g., 10 AM, 10:00-10:30 AM).

The content is shared data that was generated during an event (e.g., online meeting) in a particular project (e.g., content of conducted event, or reference materials used in conducted event). The type of content processing includes, for example, audio-recording, video-recording, file sharing, screen sharing, snapshot, voice-to-text conversion, generation of action item, chatting, uploading reference materials, handwriting operation or manipulation, pointing device operation or manipulation.

Further, the content processing ID is identification information identifying each content processing that was generated in each event.

The content includes, for example, history information indicating the content of conducted event, and an action item generated by the conducted event. The history information indicating the content of conducted event includes data, such as recorded audio data, recorded video data, snapshot, statement data of user, or reference materials.

The statement data of user includes text data obtained by converting voice data spoken by a user from recorded audio data or recorded video data, and text data input by user for chat or message. Further, the statement data of user may include text recognized from an image from recorded audio data or recorded video data using optical character recognition (OCR) or the like.

The snapshot is a process of acquiring a display screen at a certain time point in an event being conducted, as image data. The snapshot is also referred to, for example, capture or image recognition.

If the content processing type is "audio recording", the material of content (content data) includes, for example, universal resource locator (URL) indicating a storage destination of the recorded audio data.

Further, if the content processing type is "snapshot", the material of content (content data) includes, for example, URL indicating a storage destination of image data of a screen acquired by the snapshot (capture). The capture means saving of image (e.g., still image, movie image) displayed on the display 506 as image data.

If the content processing type is "voice-to-text conversion", the material of content (content data) includes, for example, URL indicating a storage destination of text data of the received voice data.

If the content processing type is "chat", the material of content (content data) includes, for example, message content posted by user. The message content includes not only text data of posted message but also a file of posted image data.

The action item indicates a content of action, which occurs in each event (e.g., meeting) in each project and is required to be performed or executed by one or more persons related to each event. If the content processing type is "action item generation", the material of content (content data) includes, for example, user ID of execution person of action item, due date for completing action item, and URL indicating a storage destination of text data indicating the content of action item.

(Functional Configuration of Sharing Assistant Server)

Hereinafter, with reference to FIG. 4, a description is given of each functional unit of the sharing assistant server 11. In the following description, each functional unit of the sharing assistant server 11, among the components illustrated in FIG. 2, the relationship with the main components for implementing each functional unit of the sharing assistant server 11 is to be also described.

The transmission/reception unit 61 of the sharing assistant server 11 illustrated in FIG. 4 is implemented by the instructions from the CPU 501 illustrated in FIG. 2 and the network I/F 509 illustrated in FIG. 2. The transmission/reception unit 61 transmits and receives various data or information to and from the user terminal 40, other server, other system, or the like via the communication network 50. The transmission/reception unit 61 is an example of transmission unit or reception unit.

The authentication unit 62, which is implemented by the instructions from the CPU 501 illustrated in FIG. 2, performs authentication by determining whether information (e.g., user ID, organization ID, and password) transmitted from the user terminal 40 matches information registered in the user authentication management DB 6001 in advance.

The creation unit 63, which is implemented by the instructions from the CPU 501 illustrated in FIG. 2, creates, for example, image data of various screens in addition to image data of reservation list screen based on reservation information and schedule information transmitted from the schedule management server 12.

The generation unit 64, which is implemented by the instructions from the CPU 501 illustrated in FIG. 2, generates conducted event ID, content processing ID, and URL of storage destination.

The determination unit 65, which is implemented by the instructions from the CPU 501 illustrated in FIG. 2, performs various determinations. The various determinations will be described later.

The detection unit 66, which is implemented by the instructions from the CPU 501 illustrated in FIG. 2, detects a keyword from the statement data of user, to described later. The keyword detected by the detection unit 66 is stored or managed by a participation candidate management DB 8010 (see FIG. 19), to be described later, in association with a user who has spoken the keyword by speaking or inputting text.

The storing/reading processing unit 69, which is implemented by the instructions from the CPU 501 illustrated in FIG. 2 and the HDD controller 505 illustrated in FIG. 2, stores various data in the storage unit 6000 and reads out various data stored in the storage unit 6000.

(Functional Configuration of Schedule Management Server)

As illustrated in FIG. 4, the schedule management server 12 includes, for example, a transmission/reception unit 81, an authentication unit 82, a generation unit 83, a term management unit 84, and a storing/reading processing unit 89. Each of the functional units of the schedule management server 12 is a function or means implemented by any one of the components illustrated in FIG. 2 under the instructions from the CPU 501 executing programs loaded on the RAM 503 from the HD 504. Further, the schedule management server 12 includes a storage unit 8000, implemented by the HD 504 illustrated in FIG. 2. In this description, the schedule management server 12 is described as an example of management system.

(User Authentication Management Table)

FIG. 10 is an example of schematic diagram of a user authentication management table. The storage unit 8000 includes a user authentication management DB 8001 configured by the user authentication management table illustrated in FIG. 10. The user authentication management table stores or manages organization ID identifying each organization to which each user belongs, and password in association with each other for user ID identifying each user.

(User Management Table)

FIG. 11 is an example of schematic diagram of a user management table. The storage unit 8000 includes a user management DB 8002 configured by the user management table illustrated in FIG. 11. The user management table stores or manages user ID, and name (user name) of each user indicated by user ID in association with each other for each organization ID. The user management table further stores or manages information about organization (i.e., organization information), such as organization name, organization leader, information about whether a user is an organization leader (flag information of organization leader), and expertise information (e.g., qualification, skills, experience) of user in association with information about each user.

The organization information is, for example, information on a department, a department, a group, a team and a project to which the user belongs. The organization information is, for example, organization name, organization ID, leader name within an organization, or the like.

The expertise information of user is information on skills and qualifications of each user. The expertise information of user is, for example, qualifications and skills of each user.

Further, the user management table can be configured to store or manage human resource information or human network information including information on relationships between persons belonging to one or more organizations and expertise information on each person. For example, the human resource information or human network information can be configured with expertise information of each person (e.g., qualification, skills, experience) and information indicating human relationships among persons, such as between one or more organizations. A given number of persons to be need for an event can be selected using the human resource information or human network information.

(Resource Management Table)

FIG. 12 is an example of schematic diagram of a resource management table. The storage unit 8000 includes, for example, a resource management DB 8003 configured by the resource management table illustrated in FIG. 12. The resource management table stores or manages resource ID identifying each resource, and name of resource (resource name) in association with each other for each organization ID.

(Resource Reservation Management Table)

FIG. 13 is an example of schematic diagram of a resource reservation management table. The storage unit 8000 includes a resource reservation management DB 8004 configured by the resource reservation management table illustrated in FIG. 13. The resource reservation management table stores or manages reservation information in a state, in which each piece of information is associated with each other. The reservation information includes, for example, resource ID, resource name, user ID of shared terminal, user ID of reservation holder (i.e., person who has made a reservation), scheduled use start date/time, scheduled use end date/time, and event name for each organization ID.

The user ID of shared terminal is a user ID of shared terminal (e.g., electronic whiteboard) installed in a conference room, in which the shared terminal (e.g., electronic whiteboard and the conference room are examples of resource.

The scheduled use start date/time indicates, for example, a scheduled use start date/time of each resource. The scheduled use end date/time indicates, for example, a scheduled use end date/time of each resource. Each date indicates, for example, year, month, day, hour, minute, second, and time zone. Each date illustrated in FIG. 13 represents year, month, day, hour, and minute due to the limitation of space.

(Event Management Table)

FIG. 14 is an example of schematic diagram of an event management table. The storage unit 8000 includes an event management DB 8005 configured by the event management table illustrated in FIG. 14. The event management table stores or manages schedule information in a state, in which each piece of information is associated with each other. The schedule information includes organization ID, user ID, user name, category of host/attendee/optional participant/consideration-requested person, scheduled event start date/time, scheduled event end date/time, event name, memo, and file data in association with each other in association with each other for each scheduled event ID.

The category of host/attendee/optional participant/consideration-requested person is information indicating whether a user identified by a user ID is any one of host/attendee/optional participant/consideration-requested person of the event identified by the scheduled event ID.

The scheduled event start date/time indicates a scheduled start date/time when an event is to be conducted. The scheduled event end date/time indicates a scheduled end date/time when an event is to be conducted.

Each date/time indicates, for example, year, month, day, hour, minute, second, and time zone. Each/time date illustrated in FIG. 14 represents year, month, day, hour, and minute for the limitation of sheet. Further, as illustrated in FIG. 14, the event management table stores or manages file data of reference file, to be used in an event indicated in the schedule information, in association with the scheduled event ID.

(Server Authentication Management Table)

FIG. 15 is an example of schematic diagram of a server authentication management table. The storage unit 8000 includes a server authentication management DB 8006 configured by the server authentication management table illustrated in FIG. 15. The server authentication management table stores or manages access ID, and access password in association with each other. The access ID and access password have the same concept as the access ID and access password stored or managed by the access management DB 6002 of the sharing assistant server 11.

(Project Member Management Table)

FIG. 16 is an example of schematic diagram of a project member management table. The storage unit 8000 includes a project member management DB 8007 configured by the project member management table illustrated in FIG. 16. The project member management table stores or manages project ID, project name, and user ID of each project member in association with each other for each organization ID.

(Conducted Event record Management Table)

FIG. 17 is an example of schematic diagram of a conducted event record management table. The storage unit 8000 includes a conducted event record management DB 8008 configured by the conducted event record management table illustrated in FIG. 17. The conducted event record management DB may be also referred to as the conducted event history management DB.

The conducted event record management table stores or manages content processing ID, type of content processing, material of content (content data), and start date/time and end date/time of content processing in association with each other for each project ID and conducted event ID.

The conducted event record management DB 8008 stores or manages data, which are partially the same as the content management DB 6005. The same data includes, for example, conducted event ID, content processing ID, type of content processing, start date/time of content processing, and end date/time of content processing. The material of content (content data) has the same storage destination only different in expression of storage destination of content data, such as http:// or c://.

(Conducted Event Management Table)

FIG. 18 is an example of schematic diagram of a conducted event management table. The storage unit 8000 includes a conducted event management DB 8009 configured by the conducted event management table illustrated in FIG. 18. The conducted event management table stores or manages event name, start date/time of event, and end date/time of event in association with each other for each conducted event ID. The conducted event management DB 8009 stores or manages information related to each event that was actually conducted among the schedule information stored or managed in the event management DB 8005.

(Participation Candidate Management Table)

FIG. 19 is an example of schematic diagram of a participation candidate management table. The storage unit 8000 includes a participation candidate management DB 8010 configured by the participation candidate management table illustrated in FIG. 19. The participation candidate management table stores or manages participation candidate information in a state, in which an organization leader and the number of times of speaking particular keyword (or the number of remarks for particular keyword) are associated with each other for each user name and each organization ID.

The participation candidate information includes, for example, particular keyword detected from statement data of user identified by organization ID and user name during one or more online meetings, and one or more users who have spoken particular keyword and the number of times of speaking particular keyword during one or more online meetings, in association with each other.

The participation candidate information is information about each member or each organization, which may become a participation candidate of an event. The participation candidate information includes, for example, identification information of participant, optional participant, consideration-requested person, organization leader, and identification information of organization (organization identification information).

The participation candidate is a member or organization, which may become a participation candidate of an event. The participation candidate includes, for example, participant, optional participant, consideration-requested person, organization leader, and organization name.

As illustrated in FIG. 19, the participation candidate management table is configured to store "keyword" and "the number of times of speaking particular keyword (the number of remarks for keyword)" that each user has spoken during previous one or more online meetings in order to assume that a specific user who has spoken a particular "keyword" more frequently as an expert having more knowledge of particular "keyword".

Further, as illustrated in FIG. 19, the participation candidate management table is configured to store "keyword" and "the number of times of speaking particular keyword" that each user belonging to each organization has spoken during previous one or more online meetings in order to assume that a specific organization that has spoken a particular "keyword" more frequently as an organization having more knowledge of particular "keyword".

Further, as illustrated in FIG. 19, the participation candidate management table is configured to identify an organization leader of a specific organization that has spoken a particular "keyword" more frequently.

(Functional Configuration of Schedule Management Server)

Hereinafter, with reference to FIG. 4, a description is given of each functional unit of the schedule management server 12. In the following description, each functional unit of the schedule management server 12, among the components illustrated in FIG. 2, the relationship with the main components for implementing each functional unit of the schedule management server 12 is to be also described.

The transmission/reception unit 81 of the schedule management server 12 illustrated in FIG. 4 is implemented by the instructions from the CPU 501 illustrated in FIG. 2 and the network I/F 509 illustrated in FIG. 2. The transmission/reception unit 81 transmits and receives various data or information to and from the user terminal 40, other server, other system, or the like via the communication network 50.

The authentication unit 82, which is implemented by the instructions from the CPU 501 illustrated in FIG. 2, performs authentication by determining whether information (e.g., user ID, organization ID, and password) transmitted from the user terminal 40 matches information registered in the user authentication management DB 8001 in advance.

Further, the authentication unit 82 performs authentication by determining whether information (e.g., access ID and access password) transmitted from the sharing assistant server 11 matches information registered in the server authentication management DB 8006 in advance.

The generation unit 83, which is implemented by the instructions from the CPU 501 illustrated in FIG. 2, has a function of generating image data of various screens such as a schedule input screen to be described later.

The term management unit 84 has a function for registering and managing the participation candidate management table (see FIG. 19) in the participation candidate management DB 8010.

The storing/reading processing unit 89, which is implemented by the instructions from the CPU 501 illustrated in FIG. 2 and the HDD controller 505 illustrated in FIG. 2, performs processing for storing various data in the storage unit 8000 and reading various data stored in the storage unit 8000.

(Functional Configuration of Voice-to-Text Conversion Server)

As illustrated in FIG. 4, the voice-to-text conversion server 13 includes, for example, a transmission/reception unit 91, a conversion unit 93, and a storing/reading processing unit 99. Each of the functional units of the voice-to-text conversion server 13 is a function or means implemented by any one of the components illustrated in FIG. 2 under the instructions from the CPU 501 executing programs loaded on the RAM 503 from the HD 504. Further, the voice-to-text conversion server 13 illustrated in FIG. 4 includes a storage unit 9000, implemented by the HD 504 illustrated in FIG. 2.

(Functional Configuration of Voice-to-Text Conversion Server)

Hereinafter, with reference to FIG. 4, a description is given of each functional unit of the voice-to-text conversion server 13. In the following description, each functional unit of the voice-to-text conversion server 13, among the components illustrated in FIG. 2, the relationship with the main components for implementing each functional unit of the voice-to-text conversion server 13 is to be also described.

The transmission/reception unit 91 of the voice-to-text conversion server 13 illustrated in FIG. 4 is implemented by the instructions from the CPU 501 illustrated in FIG. 2 and the network I/F 509 illustrated in FIG. 2. The transmission/reception unit 91 transmits and receives various data or information to and from other servers or other systems via the communication network 50.

The conversion unit 93, which is implemented by the instructions from the CPU 501 illustrated in FIG. 2, converts voice data (audio data) received by the transmission/reception unit 91 via the communication network 50 into voice-text data.

The storing/reading processing unit 99, which is implemented by the instructions from the CPU 501 illustrated in FIG. 2 and the HDD controller 505 illustrated in FIG. 2, performs processing for storing various data in the storage unit 9000 and reading various data stored in the storage unit 9000.

(Functional Configuration of Action Item Management Server)

As illustrated in FIG. 4, the action item management server 14 includes, for example, a transmission/reception unit 101, an authentication unit 102, a creation unit 103, a registration unit 104, an action unit 105, and a storing/reading processing unit 109. Each of the functional units of the action item management server 14 is a function or means implemented by any one of the components illustrated in FIG. 2 under the instructions from the CPU 501 executing programs loaded on the RAM 503 from the HD 504. Further, the action item management server 14 includes a storage unit 10000, implemented by the HD 504 illustrated in FIG. 2.

(User Authentication Management Table)

The storage unit 10000 includes a user authentication management DB 10001 configured by the user authentication management table illustrated in FIGS. 5 and 10. The user authentication management table stores or manages user ID identifying a user who can use the action item management function provided by the action item management server 14, user name, organization ID identifying an organization to which each user belongs, and password in association with each other.

(Action Item Management Table)

FIG. 20 is an example of schematic diagram of an action item management table. The storage unit 10000 includes, for example, an action item management DB 10002 configured by the action item management table illustrated in FIG. 20. The action item management table stores or manages action item ID, state, user ID of execution person who executes each action item, due date of each action item, and content of each action item in association with each other. The state indicates whether each action item has been completed or has not been completed.

(Functional Configuration of Action Item Management Server)

Hereinafter, with reference to FIG. 4, a description is given of each functional unit of the action item management server 14. In the following description of each functional unit of the action item management server 14, among the components illustrated in FIG. 2, the relationship with the main components for implementing each functional unit of the action item management server 14 is to be also described.

The transmission/reception unit 101 of the action item management server 14 illustrated in FIG. 4 is implemented by the instructions from the CPU 501 illustrated in FIG. 2 and the network I/F 509 illustrated in FIG. 2. The transmission/reception unit 101 transmits and receives various data or information to and from the user terminal 40, other server, other system, or the like via the communication network 50.

The authentication unit 102, which is implemented by the instructions from the CPU 501 illustrated in FIG. 2, performs authentication by determining whether information (e.g., user ID, organization ID, and password) transmitted from the user terminal 40 matches information registered in the user authentication management DB 10001 in advance.

The creation unit 103, which is implemented by the instructions from the CPU 501 illustrated in FIG. 2, creates, for example, image data of screen used for displaying one or more action items registered in the action item management table. The image data of screen created by the creation unit 63 is used to display a particular user who operates a particular user terminal 40, or an action item of project member to which a particular user belongs, using the particular user terminal 40.

The registration unit 104, which is implemented by the instructions from the CPU 501 illustrated in FIG. 2, receives a registration request of action item from, for example, the user terminal 40, and registers the action item in the action item management table illustrated in FIG. 20.

The action unit 105 is implemented by the instructions from the CPU 501 illustrated in FIG. 2. The action unit 105 receives a completion notification of action item from, for example, the user terminal 40, and updates the status or state of the action item management table illustrated in FIG. 20 from "not completed" to "completed" in accordance with the completion notification.

Further, when the action unit 105 receives an inquiry request for a status or state of an action item from, for example, the sharing assistant server 11 or the user terminal 40, the action unit 105 reads out the status or state of the action item corresponding to the inquiry request from the action item management table illustrated in FIG. 20, and then responds the status or state of the action item to the sharing assistant server 11 or the user terminal 40. With this configuration, the sharing assistant server 11 or the user terminal 40 can confirm whether the action item has been completed or has not been completed.

The storing/reading processing unit 109, which is implemented by the instructions from the CPU 501 illustrated in FIG. 2 and the HDD controller 505 illustrated in FIG. 2, performs processing for storing various data in the storage unit 10000 and reading various data stored in the storage unit 10000.

(Functional Configuration of User Terminal)

As illustrated in FIG. 4, the user terminal 40 includes, for example, a transmission/reception unit 51, a reception unit 52, a display control unit 54, a request unit 55, a generation unit 56, an audio control unit 58, and a storing/reading processing unit 59. Each of the functional units of the user terminal 40 is a function or means implemented by any one of the components illustrated in FIG. 2 under the instructions from the CPU 501 executing programs loaded on the RAM 503 from the HD 504. Further, the user terminal 40 includes a storage unit 5000, implemented by the HD 504 illustrated in FIG. 2.

(Functional Configuration of User Terminal)

Hereinafter, with reference to FIG. 4, a description is given of each functional unit of the user terminal 40.

The transmission/reception unit 51, which is implemented by the instructions from the CPU 501 and the network I/F 509 illustrated in FIG. 2, transmits and receives various data or information to and from other servers or other systems via the communication network 50. The transmission/reception unit 51 is an example of a transmission unit or reception unit.

The reception unit 52 is implemented mainly by the instructions from the CPU 501, the keyboard 511, and the pointing device 512 illustrated in FIG. 2, and receives various inputs from a user. The reception unit 52 is an example of reception unit.

The display control unit 54 is implemented by the instructions from the CPU 501 illustrated in FIG. 2, and displays various screens on the display 506.

For example, the display control unit 54 accesses the sharing assistant server 11, the schedule management server 12, or the action item management server 14 by activating and executing the collaboration application 5502a or the browser 5502b operable on the OS 5501 illustrated in FIG. 3.

Then, the display control unit 54 downloads WebApplication (WebAPP) including at least HyperText Markup Language (HTML), and Cascading Style Sheets (CSS), JAVASCRIPT (registered trademark), or the like, and instructs the display 506 to display various image data generated by the WebAPP. Further, for example, the display control unit 54 instructs the display 506 to display image data generated by "HTML5" including data expressed using a given format, such as Extensible Markup Language (XML), JavaScript Object Notation (JSON), or Simple Object Access Protocol (SOAP) format. The display control unit 54 is an example of display control unit.

The request unit 55, which is implemented by the instructions from the CPU 501 illustrated in FIG. 2, transmits various requests to the action item management server 14, such as a registration request of action item, and an inquiry request of state of action item.

The generation unit 56, which is implemented by the instructions from the CPU 501 illustrated in FIG. 2, has a function of generating image data of various screens to be displayed on the display 506. The generation unit 56 generates the image data of various screens using the content data received by the transmission/reception unit 51.

For example, the generation unit 56 generates image data related to text data, which is content image data, in order to render text data, which is content data, and to display the rendered data. The rendering is a process of interpreting data written in a web page description language (e.g., HTML, CSS, XML), and calculating an arrangement of characters, image data, or the like actually displayed on a screen.

The audio control unit 58, which is implemented by the instructions from the CPU 501 illustrated in FIG. 2, has a function of outputting sound signal from a speaker. The audio control unit 58 sets sound data to be output from the speaker, and reproduces the sound data by outputting sound signals related to the set sound data from the speaker.

The storing/reading processing unit 59, which implemented by the instructions from the CPU 501 and the HDD controller 505 illustrated in FIG. 2, stores various data in the storage unit 5000 and reads various data from the storage unit 5000. In this description, some devices and controllers can be configured using one or more circuits.

Each of the above described IDs is an example of identification information. The organization ID includes, for example, company name, business office name, department name, region name, or the like. The user ID includes, for example, employee number, driver's license number, and a social number in the Japanese social security and tax number system.

The functional configuration illustrated in FIG. 4 is an example, and the functions (processing units and storage units) of the sharing assistant server 11, the schedule management server 12, the voice-text conversion server 13, the action item management server 14, and the user terminal 40 may be executed by any of the sharing assistant server 11, the schedule management server 12, the voice-text conversion server 13, the action item management server 14, and the user terminal 40.

(Processing/Operation)

Hereinafter, with reference to FIGS. 21 to 24, a description is given of processing/operation of each embodiment.

(Process of Creating Participation Candidate Management Table)

Hereinafter, a description is given of a process of detecting a keyword from statement data of user, which is an example of shared data useable for detecting a keyword, among data shared during an online meeting, and creating the participation candidate management table of FIG. 19.

Figure 21:
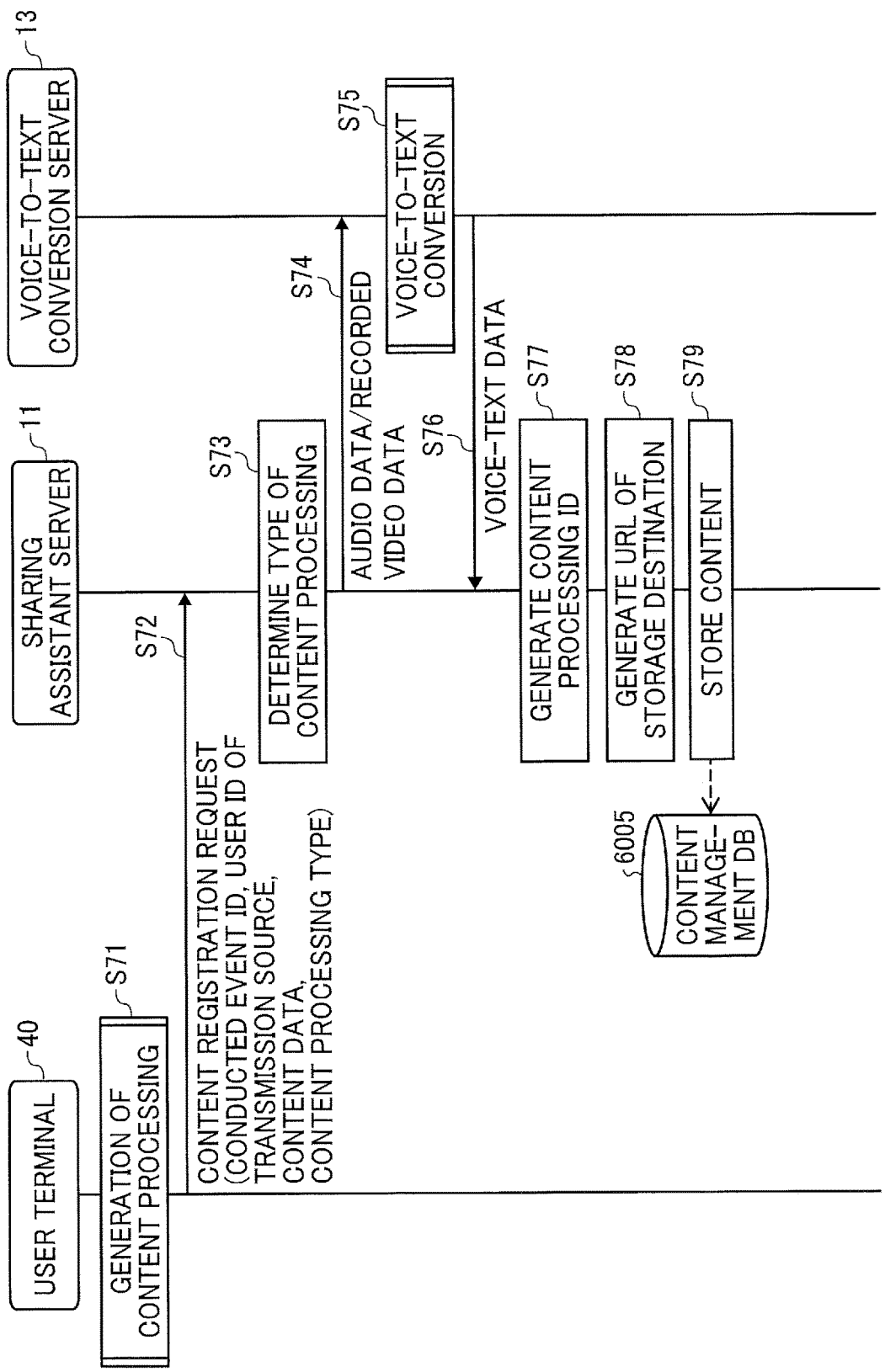
FIG. 21 is an example sequence diagram of registering data shared during an online meeting in the content management DB.
Figure 22:
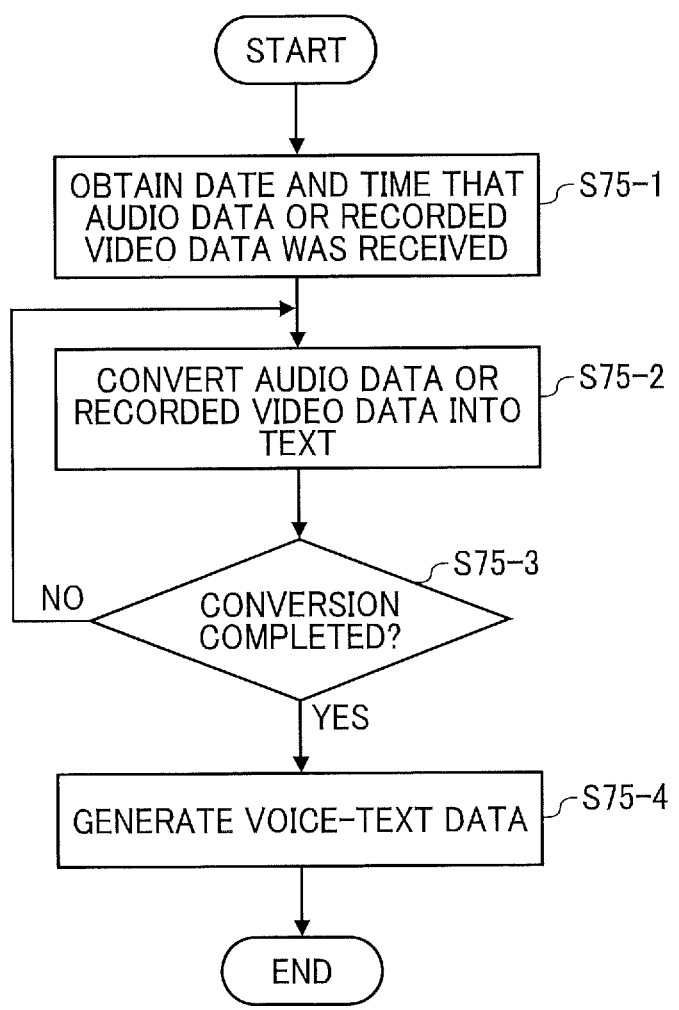
FIG. 22 is an example flowchart of processing of voice-to-text conversion.
Figure 23:
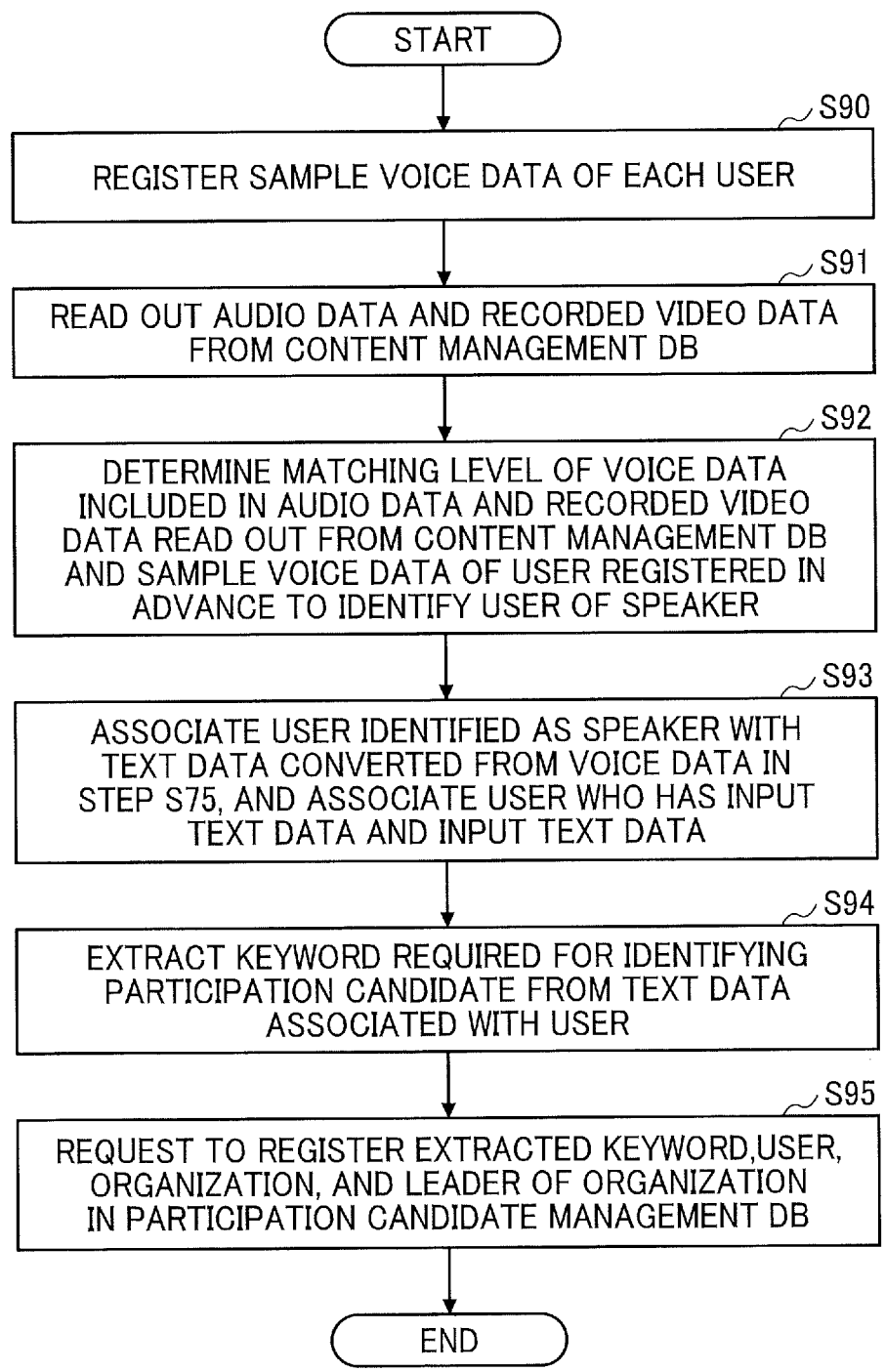
FIG. 23 is an example flowchart of creating a participation candidate management table from data shared during previous online meeting.

FIG. 21 is an example of sequence diagram of registering data shared during an online meeting in the content management DB. FIG. 22 is an example of flowchart of processing of voice-to-text conversion. FIG. 23 is an example of flowchart of creating a participation candidate management table from data shared during previous one or more online meetings.

When an event such as an online meeting has started, the user A and other participant who are members of a project for collaboration work can hold the online meeting using a voice call function, a video call function, a chat function, or the like. If the user A or other participant use functions, such as audio-recording/video-recording function, chat function, or message function, the user terminal 40 performs various types of content processing corresponding to each function (step S71).

For example, in a case of the audio-recording/video-recording function, the user terminal 40 performs the content processing in which the recorded audio data or recorded video data is generated as content. In a case of the chat function or message function, the user terminal 40 performs the content processing in which the input text data is generated as content.

Then, the transmission/reception unit 51 transmits registration request information indicating a registration request of the generated content to the sharing assistant server 11 (step S72). In step S72, the transmission/reception unit 51 automatically transmits the registration request information every time the content is generated. The content may be transmitted in a file format or in a stream format. The registration request information includes the conducted event ID, user ID of content transmission source, content data, and content processing type information. Then, the transmission/reception unit 61 of the sharing assistant server 11 receives the registration request information.

Then, the determination unit 65 of the sharing assistant server 11 determines the type of the received content processing based on the type information of content processing included in the registration request information received by the transmission/reception unit 61 (step S73).

If the determination unit 65 determines that the content processing type is "audio-recording function", the transmission/reception unit 61 of the sharing assistant server 11 transmits audio data (recorded audio) as content data to the voice-to-text conversion server 13 (step S74).

Further, if the determination unit 65 determines that the content processing type is the "video-recording function", the transmission/reception unit 61 of the sharing assistant server 11 transmits the recorded video data as content data to the voice-to-text conversion server 13 (step S74).

Then, the transmission/reception unit 91 of the voice-to-text conversion server 13 receives the audio data or recorded video data. If the content processing type is other than "audio-recording function/video-recording function", the sharing assistant server 11 does not perform the processing of steps S74 to S76, but proceeds the sequence to step S77.

Then, the conversion unit 93 of the voice-to-text conversion server 13 converts the audio data or recorded video data received by the transmission/reception unit 91 into text data (step S75). The processing of step S75 may be performable as a real-time process or a batch process.

Hereinafter, with reference to FIG. 22, a description is given of the voice-to-text conversion processing at the voice-to-text conversion server 13.

At first, the conversion unit 93 acquires or obtains information indicating the date and time when the audio data or recorded video data was received by the transmission/reception unit 91 (step S75-1). The information acquired in step S75-1 may be information indicating date and time when the sharing assistant server 11 has received the audio data or recorded video data, or date and time when the sharing assistant server 11 has transmitted the audio data or recorded video data. In this case, in step S74, the transmission/reception unit 91 of the voice-to-text conversion server 13 receives the audio data or recorded video data, and the information indicating the date and time transmitted from the sharing assistant server 11.

Then, the conversion unit 93 performs the text conversion processing of the audio data or recorded video data received by the transmission/reception unit 91 (step S75-2).

Then, if the conversion unit 93 has completed the text conversion processing of the audio data or recorded video data (step S75-3: YES), the conversion unit 93 proceeds the sequence to step S75-4. Further, the conversion unit 93 repeats the processing of step S75-2 until the conversion unit 93 has completed the text conversion processing of the audio data or recorded video data.

If the conversion unit 93 determines that the text conversion processing has completed (step S75-3: YES), the conversion unit 93 generates voice-text data converted from the audio data or recorded video data (step S75-4). Then, the voice-to-text conversion server 13 can convert the audio data or recorded video data transmitted from the sharing assistant server 11 into the voice-to-text data.

The information processing system 1 repeats the above described processing of steps S71 to S76 to repeat the text conversion processing of the audio data or recorded video data generated at the user terminal 40.

If the conversion unit 93 has completed the text conversion of audio data or recorded video data (step S75), the transmission/reception unit 91 of the voice-to-text conversion server 13 transmits the voice-text data to the sharing assistant server 11 (step S76). Then, the transmission/reception unit 61 of the sharing assistant server 11 receives the voice-text data transmitted from the voice-to-text conversion server 13.

Then, the generation unit 64 generates a unique content processing ID identifying the content processing generated by the event (step S77).

Then, the generation unit 64 generates URL of content data indicating a material of content (step S78).

Then, the storing/reading processing unit 69 stores or manages the type of content processing, start date/time and end date/time of content processing, content processing ID generated in step S77, and the material of content (content data) in the content management DB 6005 (see FIG. 9) by associating with each other for each conducted event ID received in step S72 (step S79).

After ending the online meeting, the detection unit 66 creates a participation candidate management table from the data shared during the online meeting by performing, for example, a procedure of flowchart illustrated in FIG. 23.

Before starting the processing of sequence illustrated in FIG. 23, each user who is to participate an online meeting speaks sample material, such as sample text, to register sample voice data of each user to the sharing assistant server 11 (step S90).

Then, the detection unit 66 reads out audio data and recorded video data from the content management DB 6005 (step S91).

Then, the detection unit 66 determines a matching level of voice data included in the audio data and recorded video data read out from the content management DB 6005 and the voice data (i.e., sample voice data) of each user registered in advance in step S90 to identify a speaker (step S92).

Then, the detection unit 66 associates a user identified as the speaker with the text data converted from the voice data in step S75, and further, the detection unit 66 associates a user who has input the text data using the chat function or message function, and the input text data with each other (step S93).

Then, the detection unit 66 extracts or detects one or more keywords (e.g., keyword such as patent search, application to Patent Office, and claim in a case of an online meeting related to patent matter) required for specifying or identifying one or more participation candidates for an online meeting from the text data associated with the user identified as the speaker or the user identified as the input person (step S94).

Then, the detection unit 66 requests the schedule management server 12 to register the one or more keywords detected or extracted in step S94, the user who has spoken or input the one or more keywords, an organization of the user, and a leader of the organization in the participation candidate management DB 8010 (step S95).

Then, the term management unit 84 of the schedule management server 12 receives a request from the sharing assistant server 11 to create a participation candidate management table, in which the keyword detected or extracted in step S94, the user who has spoken or input the keyword, the organization of the user, and the leader of the organization are associated with each other, and then stores or manages the created participation candidate management table in the participation candidate management DB 8010.

As to the information processing system 1 described above, as illustrated in FIG. 19, one or more particular keywords spoken by each user during the online meeting and the number of times of speaking one or more particular keywords by each user can be stored or managed in association with the user, the organization of the user, and the leader of the organization of the user.

Further, it should be noted that the embodiment is not limited to the online meeting. For example, information extracted from a shared screen projected onto a shared terminal during a meeting in which users physically gather at the same place, recorded audio data of meeting, minutes, and text character information described in materials used in the meeting may be stored or managed in association with the user, the user organization, and the leader of the user organization. In this description, the information processing system 1 can be used as an event registration system.

(Schedule Registration Processing)

Hereinafter, a description is given of a process that a reservation holder A (e.g., name is Taro Riko) registers his/her own schedule from the user terminal 40 to the schedule management server 12. The reservation holder is a reservation person.

Figure 24:
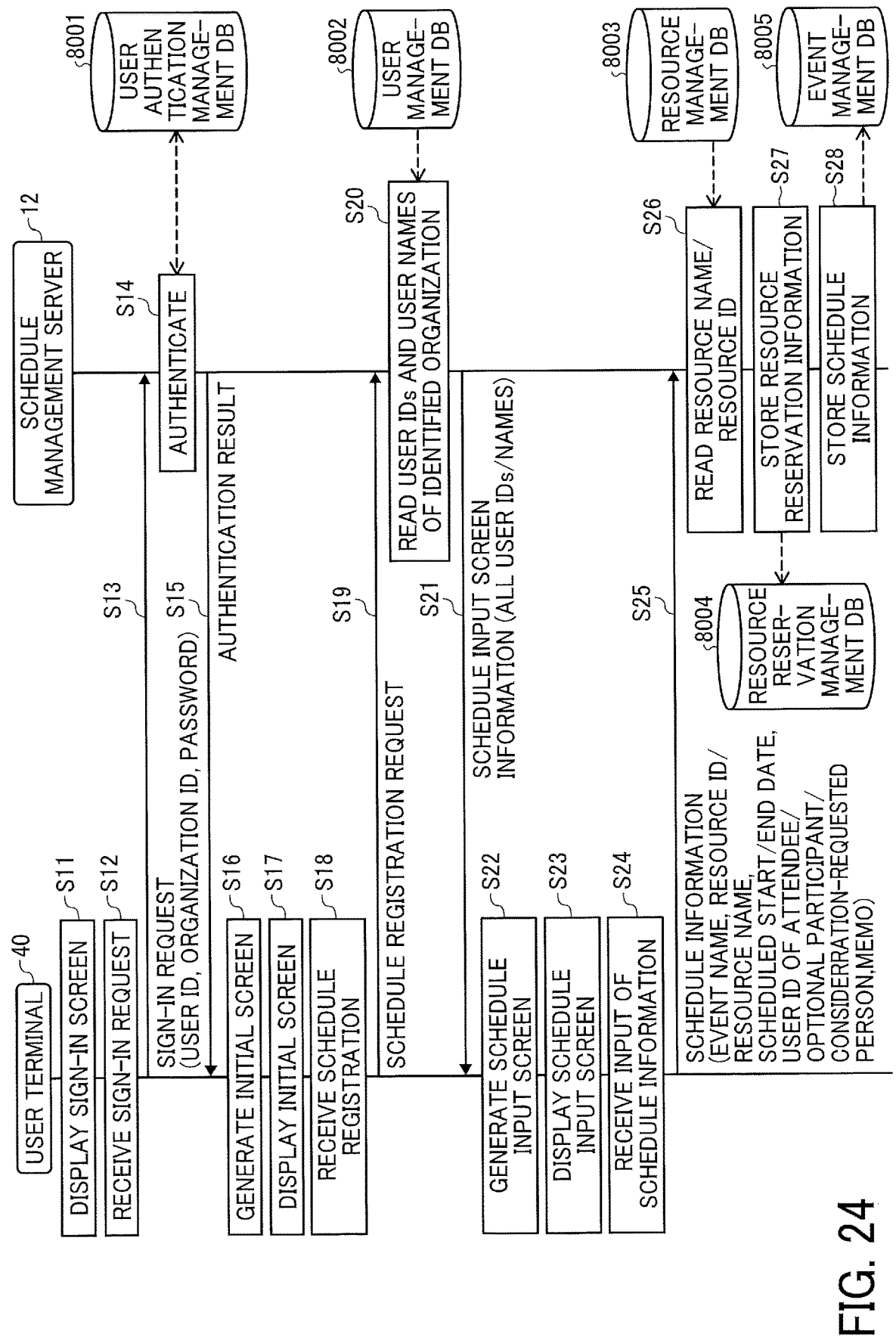
FIG. 24 is an example sequence diagram illustrating a process of registering a schedule.
Figure 25:
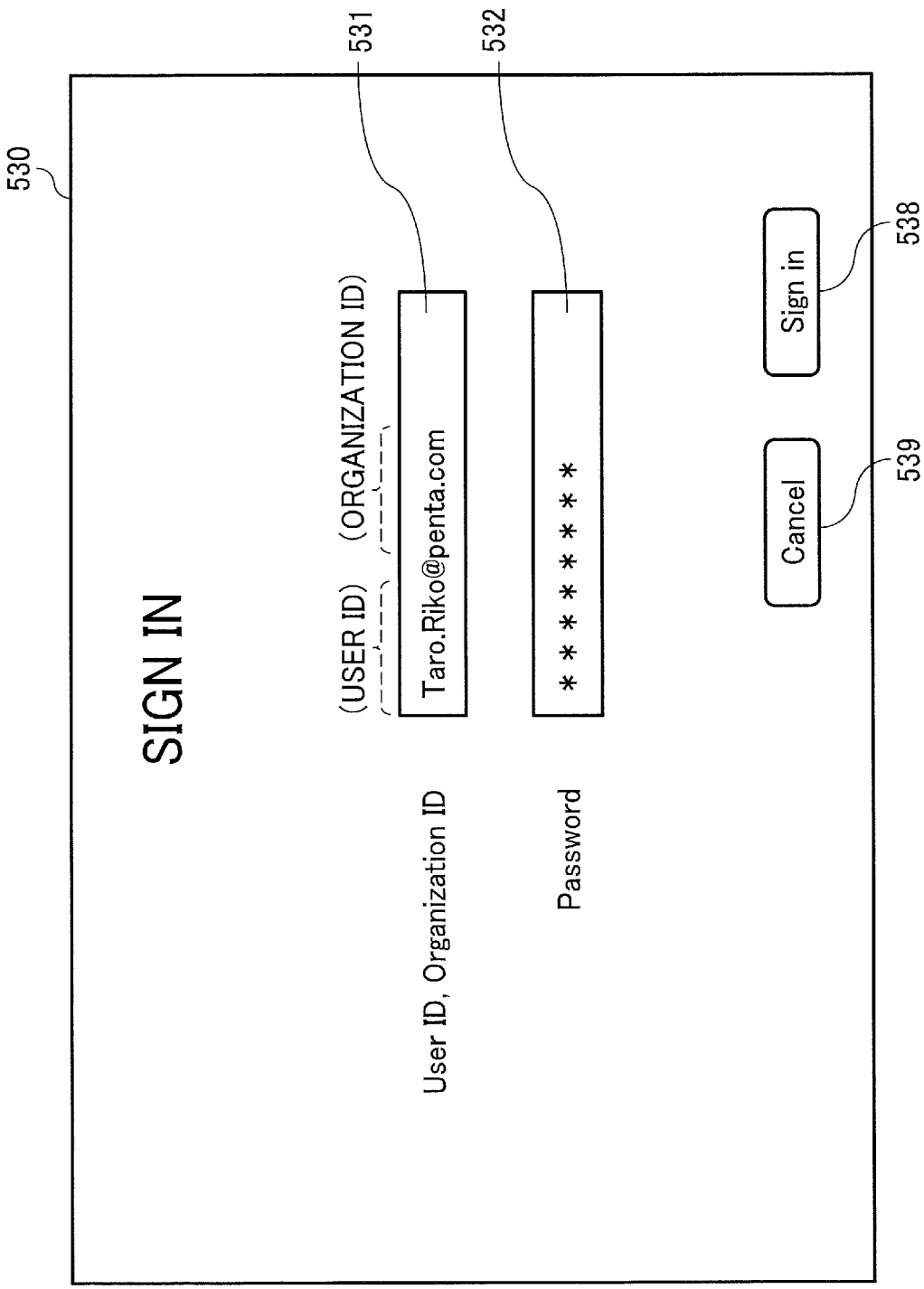
FIG. 25 is an example of sign-in screen.
Figure 26:
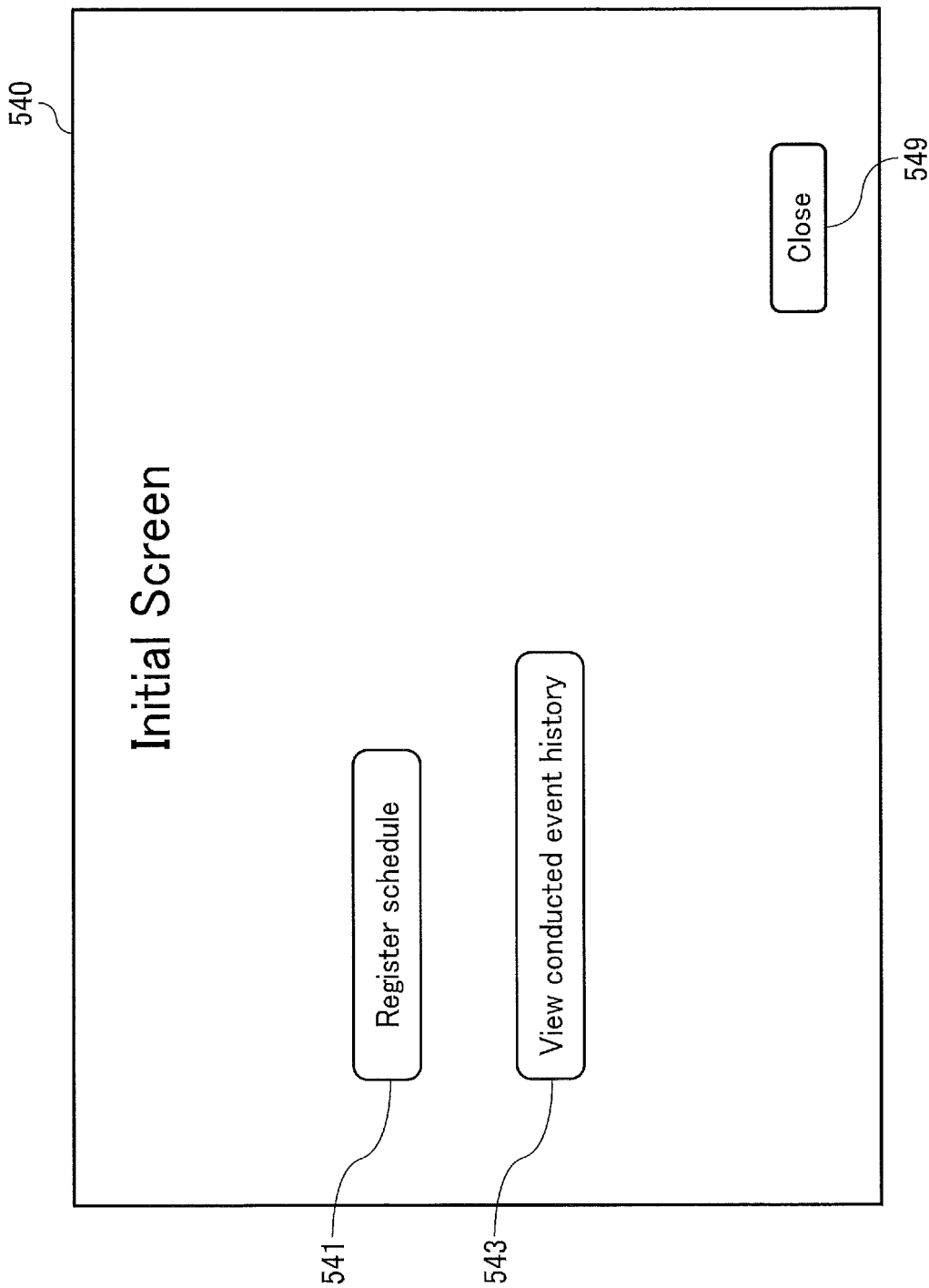
FIG. 26 is an example of initial screen of a user terminal.
Figure 27:
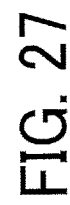
FIG. 27 is an example of schedule input screen.

FIG. 24 is an example of sequence diagram of a process of registering a schedule (schedule registration process). FIG. 25 is an example of sign-in screen. FIG. 26 is an example of initial screen of the user terminal 40. FIG. 27 is an example of schedule input screen.

At first, when the reservation holder A operates the keyboard 511 of the user terminal 40, the display control unit 54 of the user terminal 40 displays a sign-in screen 530 used for performing the sign-in on the display 506 as illustrated in FIG. 25 (step S11).

The sign-in screen 530 includes, for example, an input field 531, an input field 532, a sign-in button 538, and a cancel button 539.

The input field 531 is used for inputting a user ID and an organization ID of a user. The input field 532 is used for inputting a password.

The sign-in button 538 is to be pressed in a case of performing the sign-in. The cancel button 539 is to be pressed in a case of cancelling the sign-in.

In this example case, the user ID and the organization ID configure an e-mail address of the reservation holder A. The user name portion of the e-mail address indicates the user ID, and the domain name portion indicates the organization ID. Further, the input field 531 may be an input field used for separately inputting the user ID and the organization ID instead of the e-mail address.

Then, if the reservation holder A inputs his/her user ID and organization ID in the input field 531, inputs his/her password in the input field 532, and then presses the sign-in button 538, the reception unit 52 receives or accepts a sign-in request (step S12).

Then, the transmission/reception unit 51 of the user terminal 40 transmits sign-in request information indicating the sign-in request to the schedule management server 12 (step S13). The sign-in request information includes information received in step S12 such as user ID, organization ID, and password. Then, the transmission/reception unit 81 of the schedule management server 12 receives the sign-in request information.

Then, the authentication unit 82 of the schedule management server 12 authenticates the reservation holder A using the user ID, organization ID, and password (step S14). Specifically, the storing/reading processing unit 89 searches a combination of user ID, organization ID, and password corresponding to a combination of the user ID, organization ID, and password received in step S13, in the user authentication management DB 8001 (see FIG. 10).

If the corresponding combination exists in the user authentication management DB 8001, the authentication unit 82 determines that the reservation holder A of request source is an authenticated user.

On the other hand, if the corresponding combination does not exist in the user authentication management DB 8001, the authentication unit 82 determines that the reservation holder A is not an authenticated user (i.e., the reservation holder A is an unauthenticated user). If the reservation holder A is the unauthenticated user, the transmission/reception unit 81 notifies the user terminal 40 that the reservation holder A is the unauthenticated user.

In this example case, the description is given by assuming the reservation holder A is the authenticated user.

Then, the transmission/reception unit 81 transmits an authentication result to the user terminal 40 (step S15). Then, the transmission/reception unit 51 of the user terminal 40 receives the authentication result.

Then, in response to receiving the authentication result indicating that the authentication result is valid in step S15, the generation unit 56 of the user terminal 40 generates an initial screen 540 illustrated in FIG. 26 (step S16).

Then, the display control unit 54 of the user terminal 40 instructs the display 506 to display the initial screen 540 as illustrated in FIG. 26 (step S17).

As illustrated in FIG. 26, the initial screen 540 includes, for example, a "register schedule" button 541 to be pressed when a schedule is registered, and a "view conducted event record" button 543 to be pressed when a conducted event record is to be viewed.

If the user presses the "register schedule" button 541, the reception unit 52 receives the schedule registration request (step S18).

Then, the transmission/reception unit 51 transmits the schedule registration request information to the schedule management server 12 (step S19). Then, the transmission/reception unit 81 of the schedule management server 12 receives the schedule registration request information.

Then, the storing/reading processing unit 89 of the schedule management server 12 searches the user management DB 8002 (see FIG. 11) using the organization ID received in step S13 as a search key to read out all of corresponding user IDs and all of corresponding user names (step S20).

Then, the transmission/reception unit 81 transmits schedule input screen information to the user terminal 40 (step S21). Then, the transmission/reception unit 51 of the user terminal 40 receives the schedule input screen information.

The schedule input screen information includes all of user IDs and all of user names read out in step S20. All of user names also include a title (name) of the reservation holder, such as the reservation holder A, who has input the information for the sign-in in step S12 (see FIG. 24).

Then, at the user terminal 40, the generation unit 56 generates a schedule input screen 550 (see FIG. 27) using the schedule input screen information received in step S21 (step S22).

Then, the display control unit 54 of the user terminal 40 instructs the display 506 to display the schedule input screen 550 (step S23).

As illustrated in FIG. 27, the schedule input screen 550 includes, for example, an input field 551, a display field 552, an input field 553, an input field 554, and an input field 555.

The input field 551 is used for inputting an event name. The display field 552 is used for displaying one or more keywords related to an event.

The input field 553 is used for inputting a resource ID or resource name of a place to be used (e.g., conference room). The input field 554 is used for inputting a scheduled start date and time and an scheduled end date and time of an event. The input field 555 is used for inputting a memo, such as an agenda.

The schedule input screen 550 screen further includes an input field 556, a display area 557, a display field 558, a "schedule setting" button 559, and a "close" button 560.

The input field 556 is used for inputting one or more participants other than the reservation holder. The display area 557 is used for displaying a host or organizer. The display field 558 is used for displaying one or more user names of one or more users registered as attendee/optional participant/consideration-requested person of an event.

The "schedule setting" button 559 is to be pressed in a case of setting a reservation (schedule). The "close" button 560 is to be pressed in a case of canceling the content being input or the input content.

Further, the resource ID or the resource name is not required to input in the input field 553, such as the input field 553 is left blank when no resources are to be used.

Figure 28:
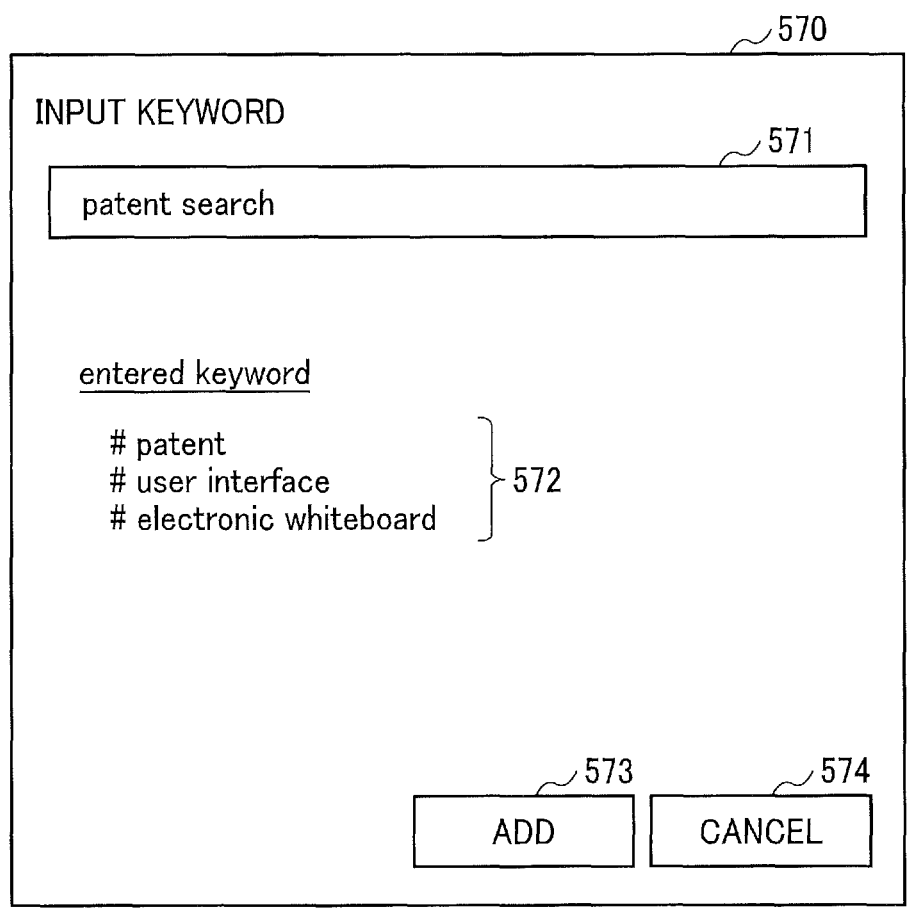
FIG. 28 is an example of keyword input screen.

Further, when "+" button is pressed at the display field 552 used for displaying the keyword related to the event, a keyword input screen 570 (see FIG. 28) may be displayed to receive an input of keyword from the reservation holder A. FIG. 28 is an example of keyword input screen.

As illustrated in FIG. 28, the keyword input screen 570 includes an input field 571, a display field 572, an "add" button 573, and a "cancel" button 574.

The input field 571 is used for inputting a keyword related to an event. The display field 572 is used for displaying entered each keyword.

The "add" button 573 is used for adding a keyword input in the input field 571 as the entered keyword. The "cancel"

button 574 is to be pressed in a case of canceling the content being input or the input content.

Figure 29:
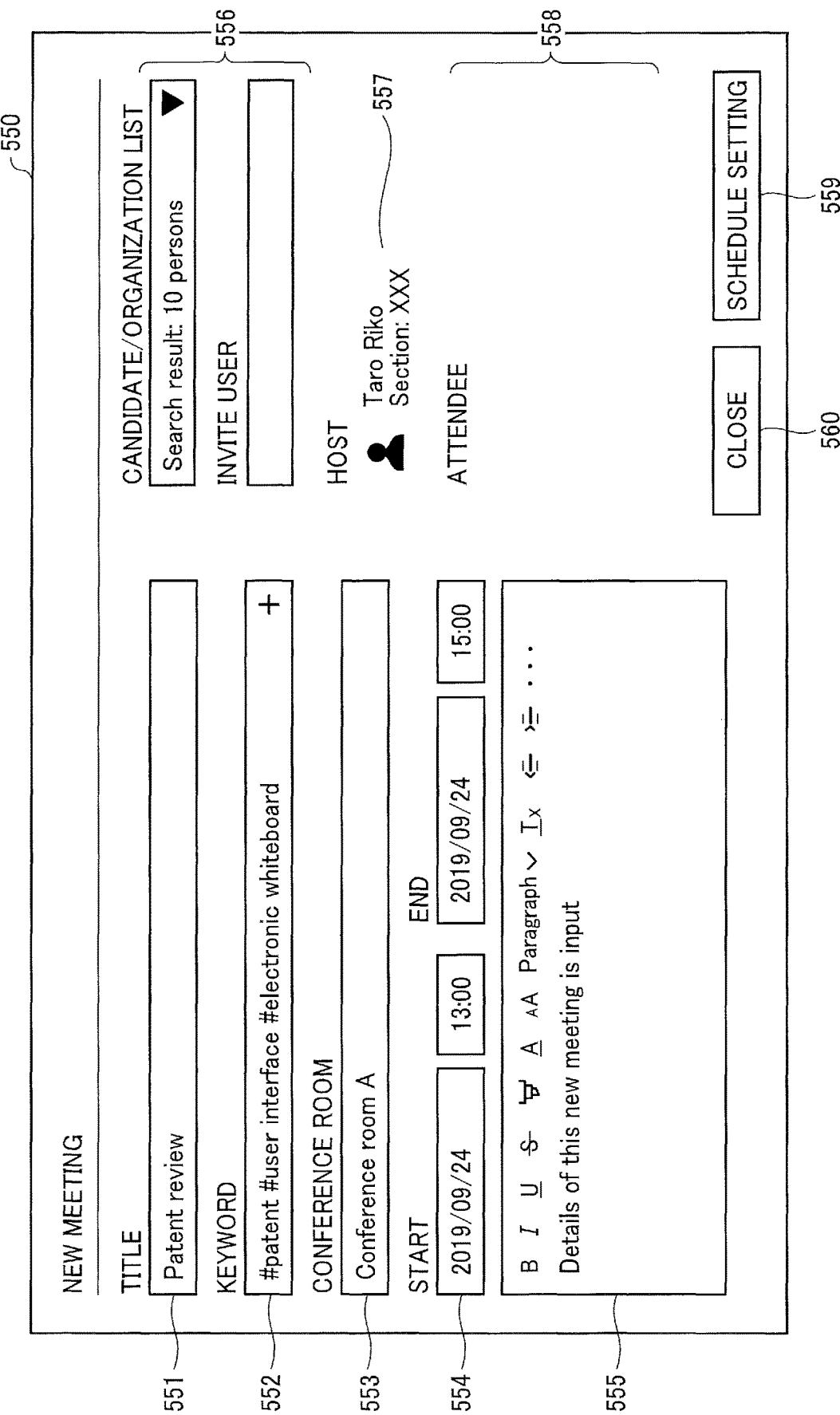
FIG. 29 is an example of schedule input screen.

For example, when the reservation holder A inputs a keyword of "patent search" related to a to-be-held online meeting in the input field 571, and then presses the "add button" 573, the reservation holder A can add the keyword as the entered keyword. Further, the entered keyword is displayed in the display field 552 as indicated in a schedule input screen 550 of FIG. 29.

Figure 30:
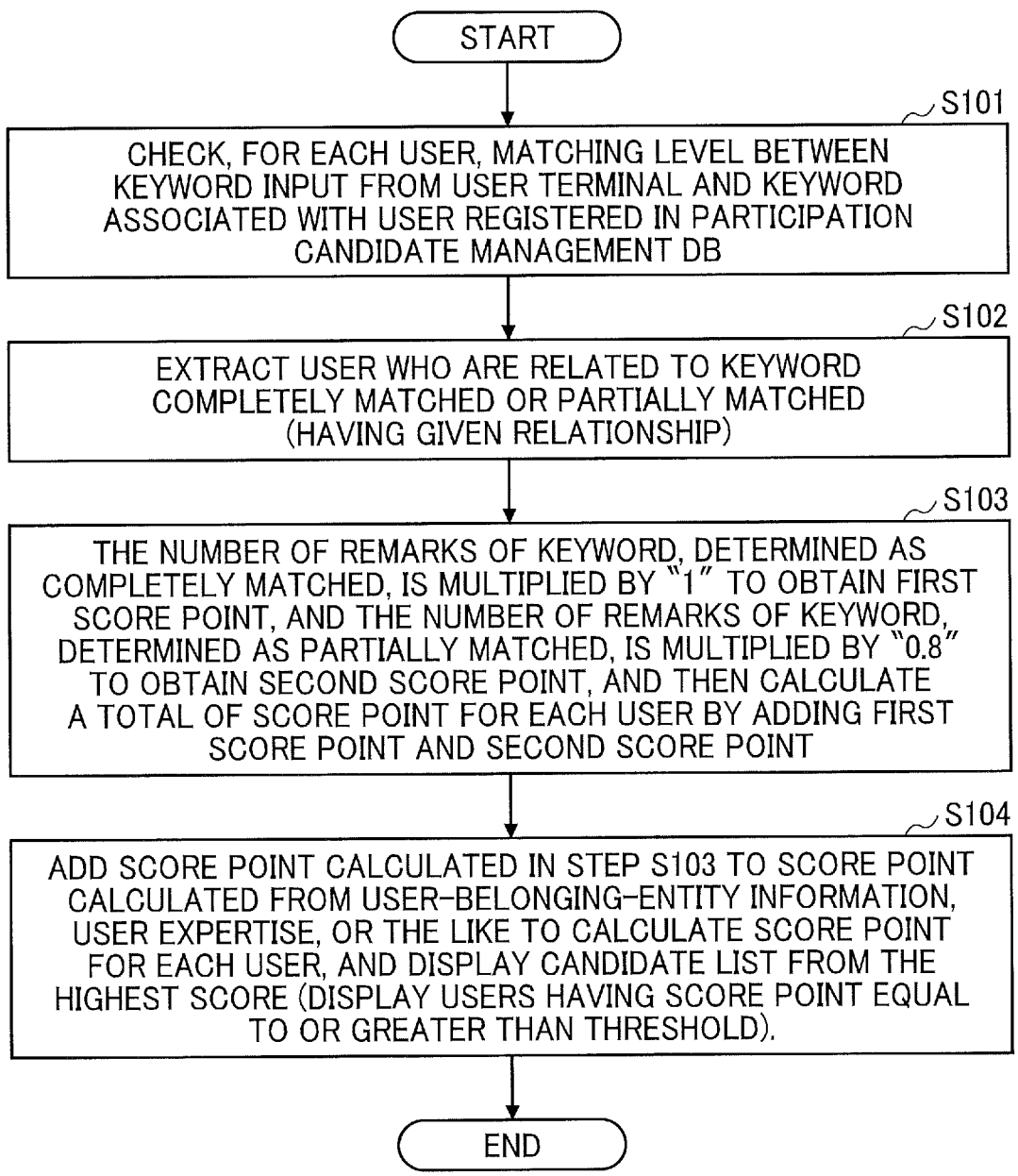
FIG. 30 is a flowchart illustrating a process of searching candidate of attendee/optional participant/consideration-requested person of an online meeting.
Figure 31:
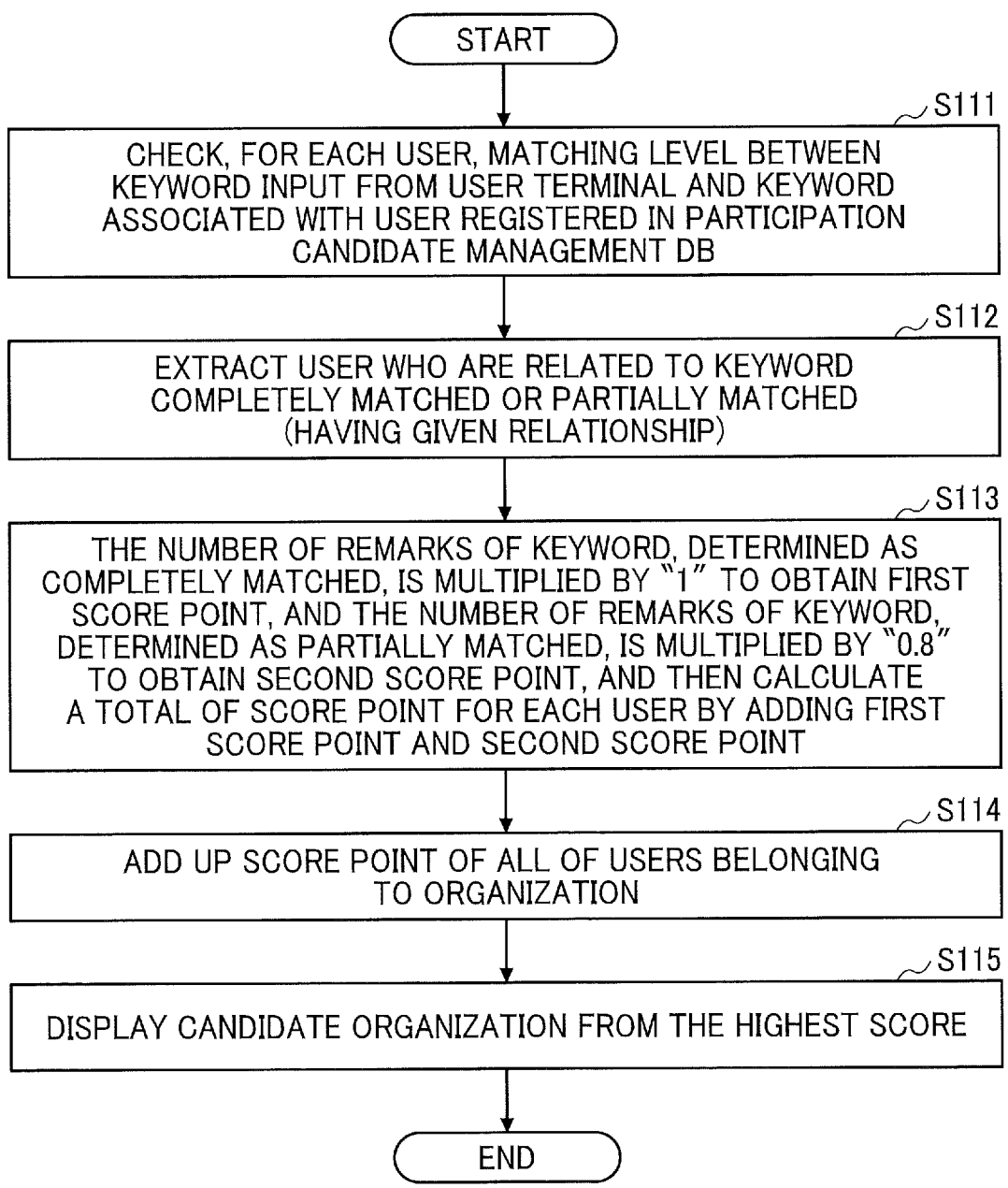
FIG. 31 is a flowchart illustrating a process of searching one or more candidates of organization as attendee/optional participant/consideration-requested person for an online meeting.

Further, by adding the entered keyword, the input field 556 of the schedule input screen 550 (see FIG. 29) displays a search result of candidate of attendee/optional participant/consideration-requested person or candidate of organization of an online meeting that is searched using the sequences of FIG. 30 or 31 and the entered keyword or the like.

FIG. 30 is a flowchart illustrating a process of searching candidate of attendee/optional participant/consideration-requested person of an online meeting.

The term management unit 84 of the schedule management server 12 checks, for each user, a matching level between a keyword input from the user terminal 40 and a keyword associated with one or more users registered in the participation candidate management DB 8010 (step S101).

Then, the term management unit 84 extracts one or more particular users who are related to one or more keywords input from the user terminal 40, and one or more keywords associated with the users and registered in the participation candidate management DB 8010 based on a determination that the input keyword and the registered keyword are completely matched or partially matched, which means the input keyword and the registered keyword have a given relationship with each other (step S102).

For example, "completely matched" refers to a case that the keyword of "patent search" is registered in the participation candidate management DB 8010, and the keyword of "patent search" is input at the user terminal 40, which means the concerned keywords match completely.

Further, "partially matched" refers to a case that the keyword of "patent search" is registered in the participation candidate management DB 8010, and the keyword of "patent" is input to the user terminal 40, which means the concerned keywords match partially although the concerned keywords do not match completely.

Further, if the keyword of "patent search" is registered in the participation candidate management DB 8010 and a keyword of "patent" is input to the user terminal 40, at the time when the keyword of "patent" is input to the user terminal 40, the term management unit 84 is preferably configured not to determine that the concerned keywords do not match partially. Specifically, the term management unit 84 decomposes the keyword of "patent search" into each noun information, such as "patent"+"search" to determine a matching level of concerned keywords. Since the term management unit 84 determines that the "patent" completely matches and the "search" do not match, the term management unit 84 can determine that the concerned keywords match partially.

If the keyword of "application to Patent Office" is registered in the participation candidate management DB 8010 and the keyword of "application" is input at the user terminal 40, the term management unit 84 decomposes the keyword of "application to Patent Office" into each noun information such as "Patent Office"+"application", and checks the matching level of concerned keywords. Since the term management unit 84 determines that the "application" completely matches and the "Patent Office" do not match, the term management unit 84 can determine that the concerned keywords match partially.

Then, the term management unit 84 reads out the number of times of speaking a particular keyword, which is determined as completely matched, from the participation candidate management DB 8010, and multiplies the number of times of speaking the particular keyword with "1" to obtain a first score point, and further reads out the number of times of speaking another particular keyword, which is determined as partially matched, from the participation candidate management DB 8010, and multiplies the number of times of speaking another particular keyword with "0.8" to obtain a second score point, and then calculates a total sum of score point for each user by adding the first score point and second score point (step S103).

Then, the term management unit 84 adds the score point calculated in step S103 to a score point calculated from the user-belonging-entity information, user expertise, or the like to calculate a score (score point) for each user, and then searches one or more candidates in the order from the highest score, and then a search result of candidate can be displayed in the user terminal 40 as the candidate of attendee/optional participant/consideration-requested person of the online meeting, to be described later (step S104).

Figure 32:
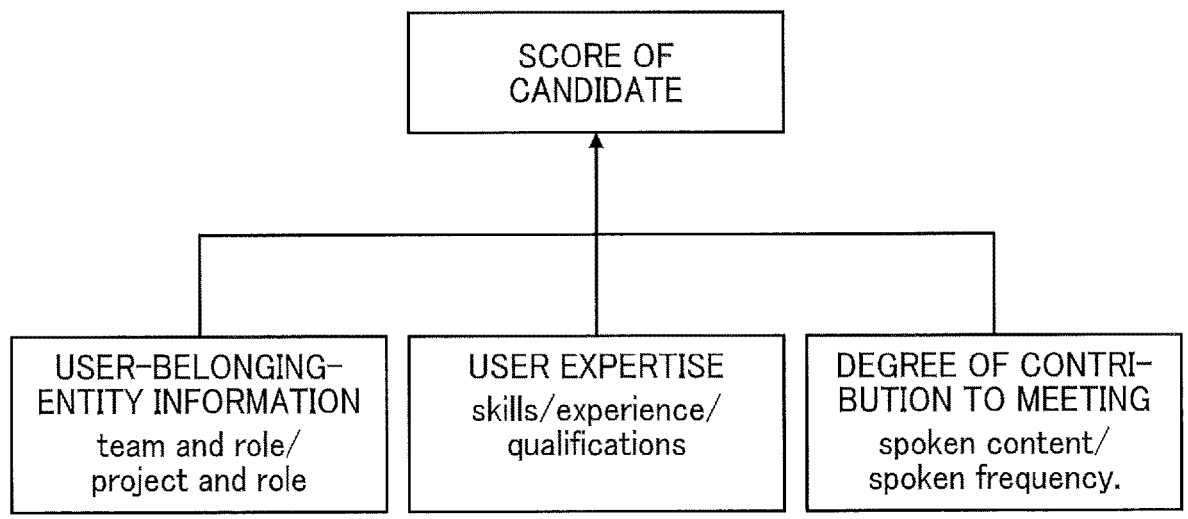
FIG. 32 is a diagram of calculating a score as a candidate.

Specifically, the term management unit 84 performs the processing in step S104 by calculating a score of each user as a candidate based on the user-belonging-entity information, user expertise, and degree of contribution to meeting as illustrated in FIG. 32.

The user-belonging-entity information includes, for example, a team and role to which each user belongs, a project and a role to which the user belongs. For example, as to a calculation method using the organization information, if a user is an organization leader, one point is added to the user because the user has the decision authority during the meeting.

The user expertise includes, for example, skills, experience, and qualifications. The degree of contribution to the meeting includes, for example, spoken content, and spoken frequency. For example, in a calculation method using the expertise information, if a meeting is related to patent, one point is added to a patent attorney or a user who is qualified by the intellectual property examination.

By calculating a score of user as a candidate using the scheme illustrated in FIG. 32, one or more candidates who have skills/experience/qualifications that match a topic of the online meeting, and one or more candidates who are likely to contribute to improving productivity of the online meeting can be searched.

FIG. 31 is a flowchart illustrating a process of searching one or more candidates of organization of attendee/optional participant/consideration-requested person for an online meeting. The processing of steps S111 to S113 in FIG. 31 is the same as the processing of steps S101 to S103 in FIG. 30.

After calculating the score point for each user in step S113, the term management unit 84 adds up the score point of all users belonging to each organization (step S114).

Then, a search result of candidate can be displayed on the user terminal 40 as a candidate organization of attendee/optional participant/consideration-requested person of the online meeting, to be described later (step S115).

Figure 33:
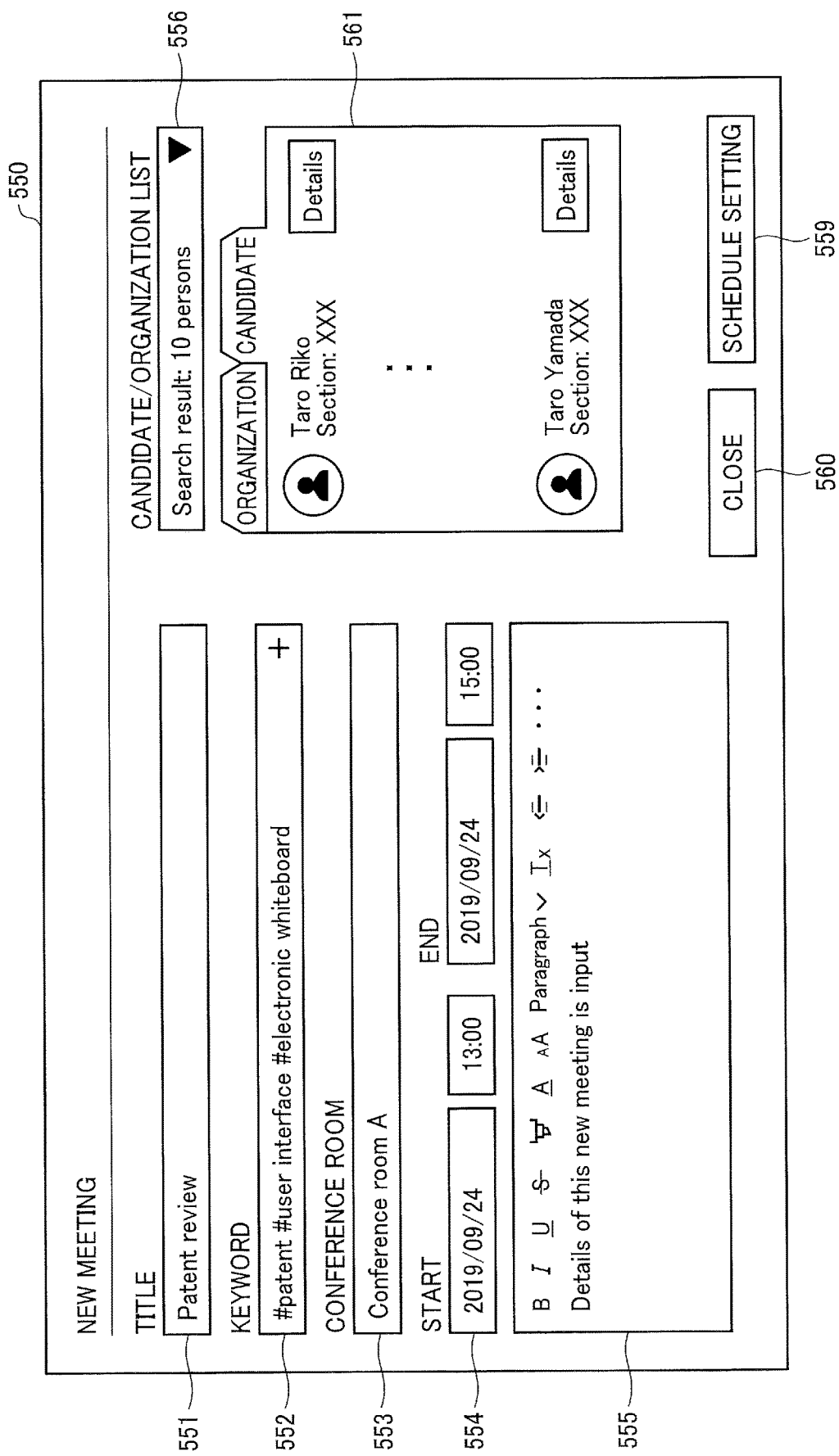
FIG. 33 is an example of schedule input screen.
Figure 34:
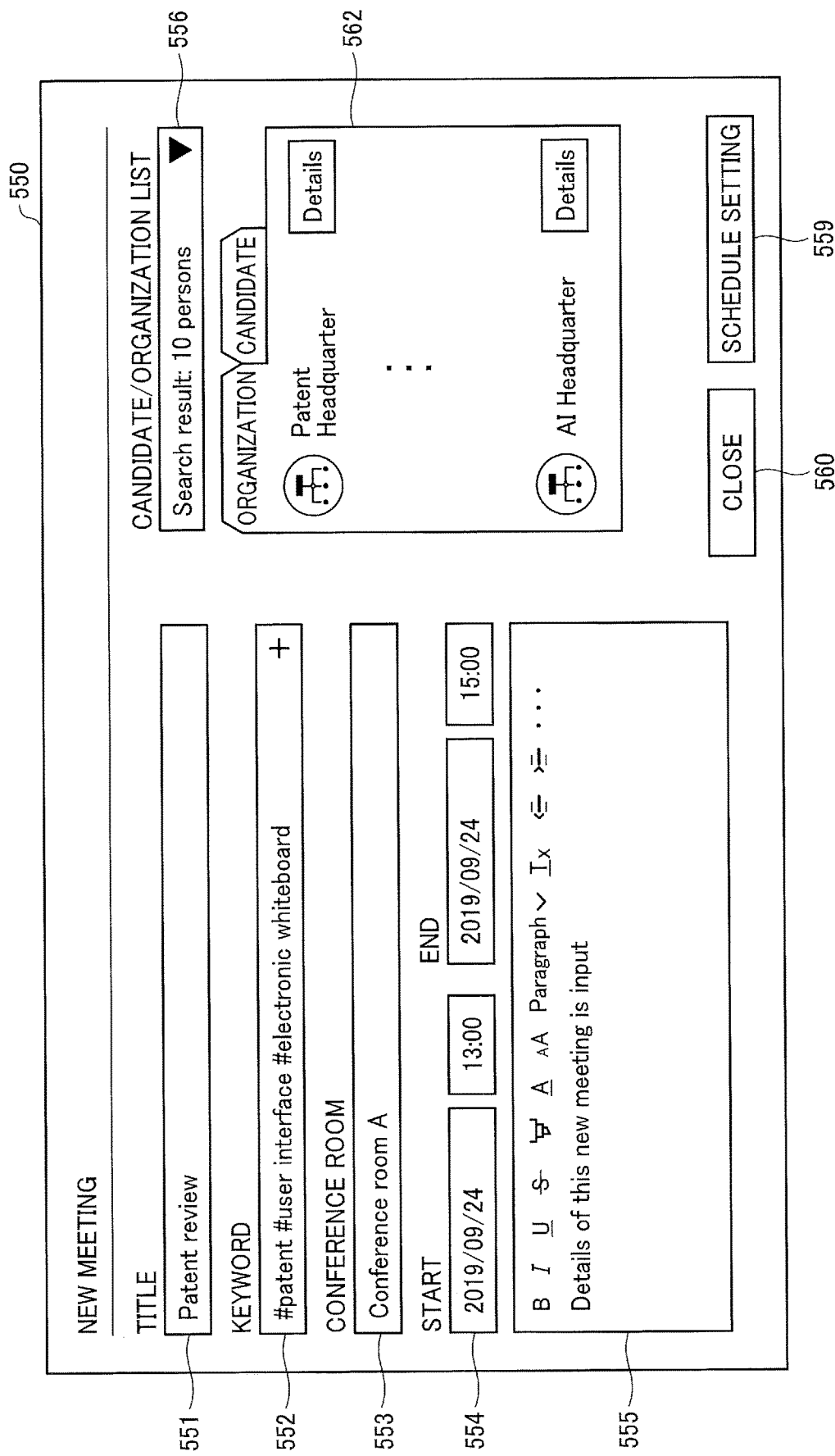
FIG. 34 is an example of schedule input screen.

If the reservation holder A presses a pull-down button of the candidate/organization list in the input field 556 on the schedule input screen 550 (see FIG. 29), the display control unit 54 of the user terminal 40 can display a candidate list 561 (see FIG. 33) and a candidate organization list 562 (see FIG. 34). The candidate list 561 and the candidate organization list 562 can be switched for displaying using each tab indicated in FIG. 33 and FIG. 34.

The candidate list 561 displays one or more names of users as candidates of attendee/optional participant/consideration-requested person, which are the search result of candidate, and a "details" button is provided for each candidate. If the "details" button is pressed, the display control unit 54 displays a detail screen 580 illustrated in FIG. 35.

Figure 35B:
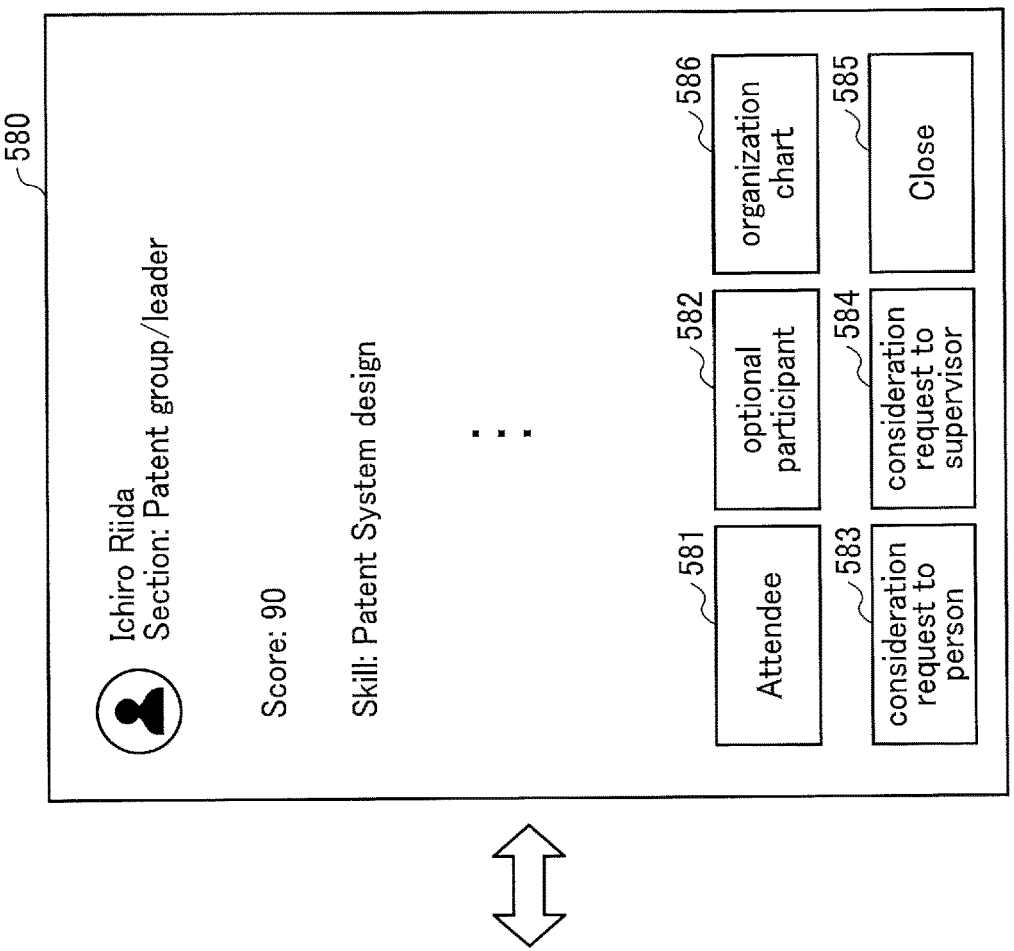
FIGS. 35A and 35B are examples of detailed screen.
Figure 35A:
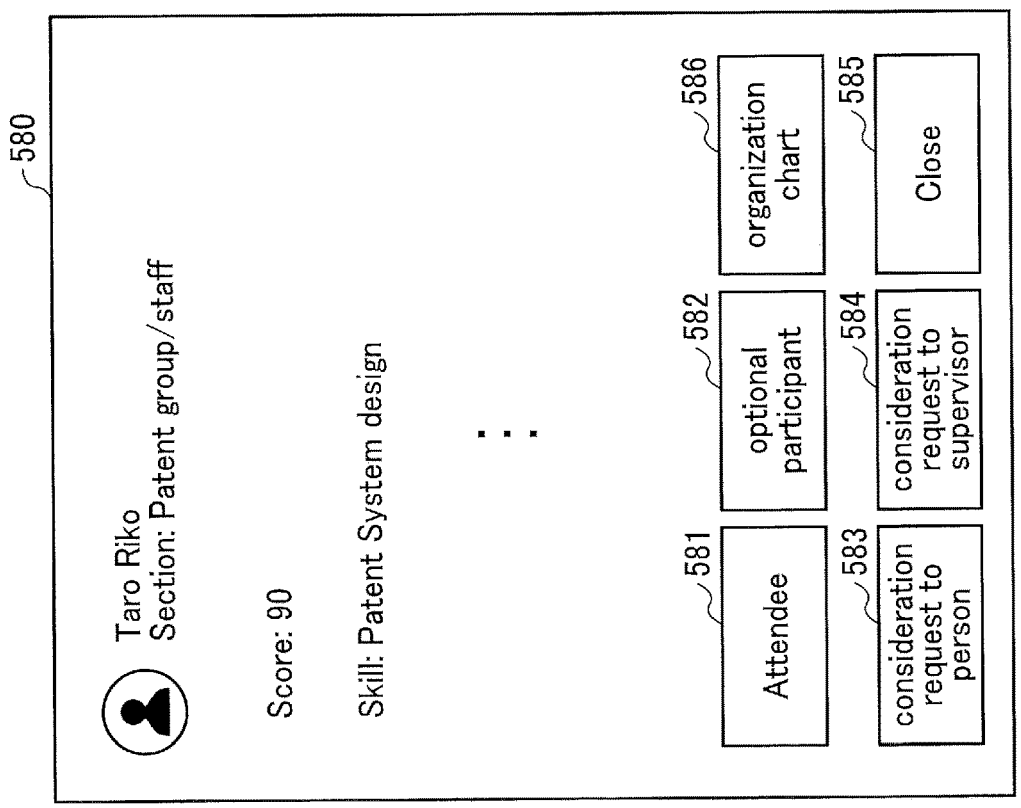

FIGS. 35A and 35B are examples of detailed screen. FIG. 35A is an example of a screen displaying a candidate, and FIG. 35B is an example of a screen displaying a supervisor of candidate. The screen of FIG. 35A and the screen of FIG. 35B may be displayed by switching the screens, or may be displayed simultaneously. In FIGS. 35A and 35B, the candidate and the supervisor are displayed, but is not limited to the supervisor. For example, a colleague or subordinate of the candidate may be selected and displayed using the organization information. Further, the organization information may be also used to select and display a candidate from other department having a position or authority equivalent to the candidate.

The detailed screen 580 includes detailed information of candidate, an "attendee" button 581, an "optional participant" button 582, a "consideration request to person" button 583, a "consideration request to supervisor" button 584, a "close" button 585, and an "organization chart" button 586.

The "attendee" button 581 is used for adding each candidate as attendee.

The "optional participant" button 582 is used for adding each candidate as optional participant.

The "consideration request to person" button 583 is used for adding each candidate as consideration-requested person.

The "consideration request to supervisor" button 584 is used for adding a supervisor of a particular candidate as consideration-requested person.

The "close" button 585 is to be pressed in a case of canceling the content being input or the input content.

If a particular person is an indispensable person for the online meeting and is a candidate who the reservation holder A wants to add as an attendee, the reservation holder A presses the "attendee" button 581.

If a particular person is a person who the reservation holder A wants to request a participation and is a candidate who the reservation holder A wants to add as an optional participant in consideration of a discussion of the online meeting, the reservation holder A presses the "optional participant" button 582.

If a particular person is a person who the reservation holder A wants to request a participation as attendee or optional participant of an online meeting and is a candidate who the reservation holder A wants to add as a candidate person for considering the participation, the reservation holder A presses the "consideration request to person" button 583.

Further, if a particular person is a person of an organization who the reservation holder A wants to request for considering a participation of another person as attendee or optional participant of an online meeting and is an a candidate of an organization who the reservation holder A wants to add as a consideration-requested person who considers the participation of another person, the reservation holder A presses the "consideration request to supervisor" button 584.

The request for consideration of participation is transmitted to a user (e.g., supervisor) added as the consideration-requested person by e-mail or the like. Then, the user added as the consideration-requested person signs in, reviews the attendee and optional attendee of the online meeting, and adds appropriate user or delete inappropriate user.

Figure 37:
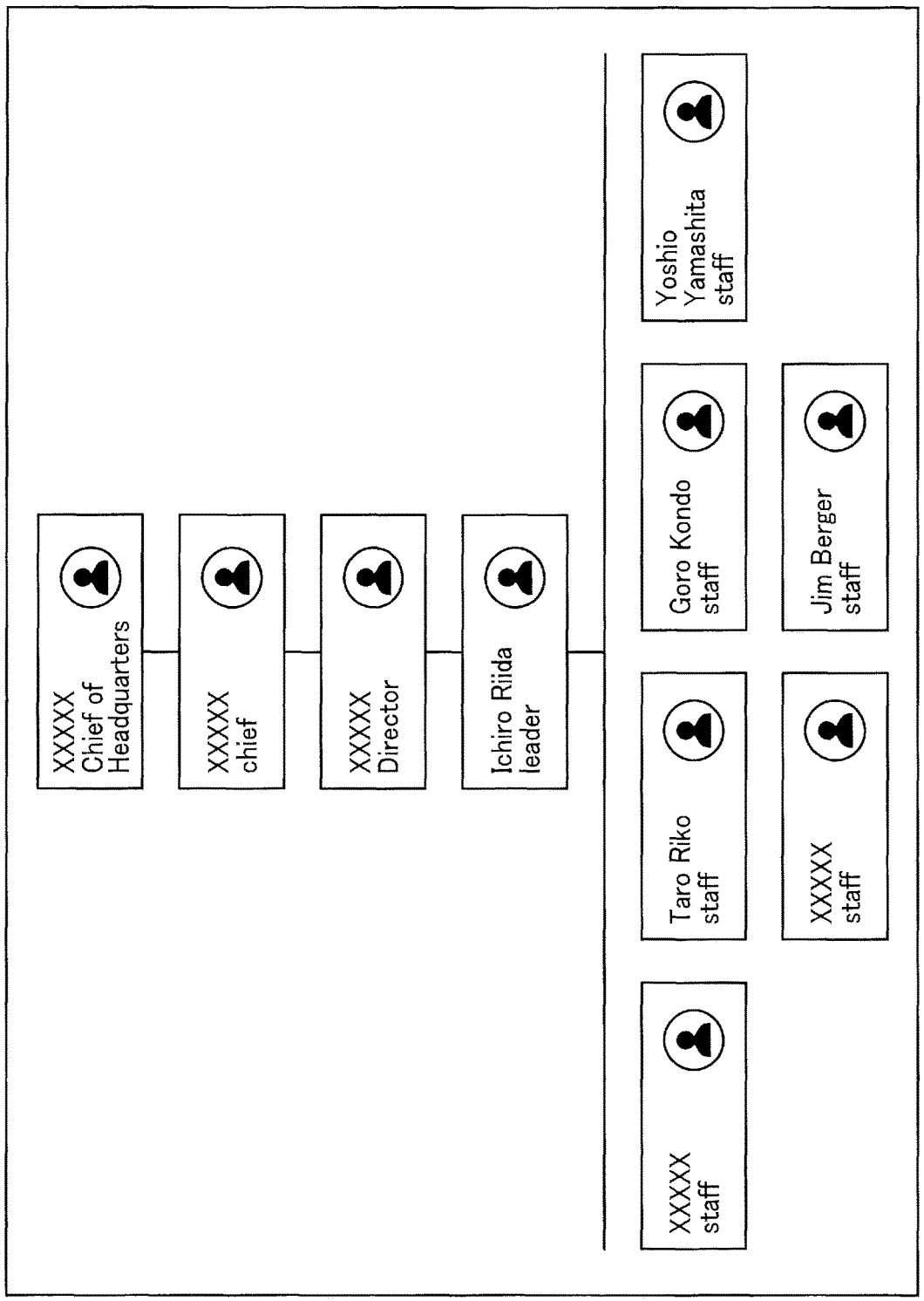
FIG. 37 is an example of user list of candidate organization.

Further, if the reservation holder A presses the "organization chart" button 586, an organization chart (e.g., FIG. 37) to which the displayed candidate (see FIG. 35A) belongs is displayed.

Figure 36:
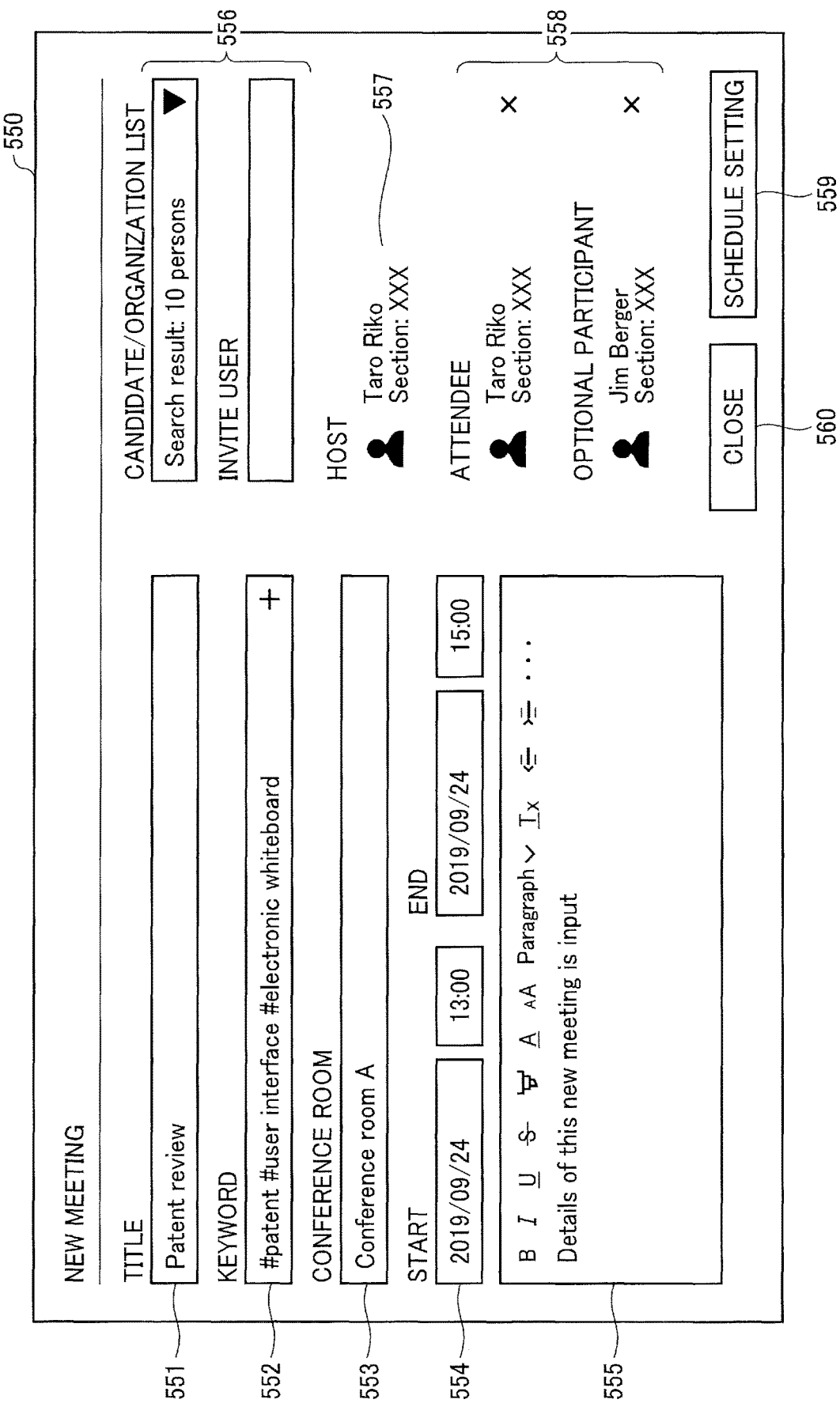
FIG. 36 is an example of schedule input screen.

The attendee/optional participant/consideration-requested person of the online meeting added by an operation of the reservation holder A on the detailed screen 580 (see FIG. 35) is displayed in the display field 558 of the schedule input screen 550 (see FIG. 36).

Further, as illustrated in FIG. 34, the above described candidate organization list 562 displays a search result of candidate organization provided with "details" button for each candidate organization. If the "details" button is pressed, the display control unit 54 displays a user list of candidate organization corresponding to the pressed "details" button. By performing an operation of selecting a user from the user list (see FIG. 37) by the reservation holder A, the detailed screen (FIG. 35) is displayed, and then the user can be added as attendee/optional participant/consideration-requested person.

Returning to FIG. 24, the reservation holder A performs an operation of pressing the "schedule setting" button 559 after inputting required items in the schedule input screen 550. Then, the reception unit 52 of the user terminal 40 receives the input of the schedule information (step S24).

Then, the transmission/reception unit 51 transmits the schedule information to the schedule management server 12 (step S25).

The schedule information includes, for example, event name, resource ID (or resource name), scheduled start date and time, scheduled end date and time, user ID of attendee/optional participant/consideration-requested person, and memo. Then, the transmission/reception unit 81 of the schedule management server 12 receives the schedule information.

Then, if the schedule management server 12 receives the resource ID (or resource name) in step S25, the schedule management server 12 searches the resource management DB 8003 (see FIG. 12) using the received resource ID as a search key to read out the corresponding resource name (or resource ID) (step S26).

Then, the storing/reading processing unit 89 stores reservation information for the resource name (or resource ID) read out in step S26 in the resource reservation management DB 8004 (see FIG. 13) (step S27). The storing/reading processing unit 89 adds one record of the reservation information to the resource reservation management table stored in the resource reservation management DB 8004 managed by the scheduler registered in advance. The reservation information is configured based on the schedule information received in step S25 and the resource name (or resource ID) read out in step S26.

Further, the scheduled use start date/time stored in the resource reservation management DB 8004 corresponds to the scheduled start date/time included in the schedule information. Further, the scheduled use end date/time stored in the resource reservation management DB 8004 corresponds to the scheduled end date/time included in the schedule information.

Further, the storing/reading processing unit 89 stores the schedule information (event information) in the event management DB 8005 (see FIG. 14) (step S28). The storing/reading processing unit 89 adds one record of the schedule information to the event management table of the event management DB 8005 managed by the scheduler registered in advance.

The schedule information is configured based on the schedule information received in step S25. Further, the scheduled event start date/time stored in the event management DB 8005 corresponds to the scheduled start date/time included in the schedule information. Further, the scheduled event end date/time stored in the event management DB 8005 corresponds to the scheduled end date/time included in the schedule information.

With this configuration, the reservation holder A can register his/her schedule in the schedule management server 12. It should be noted that the registration is not limited to the online meeting, but the registration can be applied to a meeting where users gather physically at the same place.

(Appointment Processing of Optional Participant)

A user who is added as an optional participant is not required to participate an online meeting, but the user added as the optional participant may be requested to participate the online meeting depending a discussion of the online meeting. Therefore, by providing a function of adding a particular user as an optional participant, the particular user does not need to participate the online meeting if a participation of the particular user is not required during a given time range in the online meeting, with which the time of the particular user may not be wasted.

Figure 38:
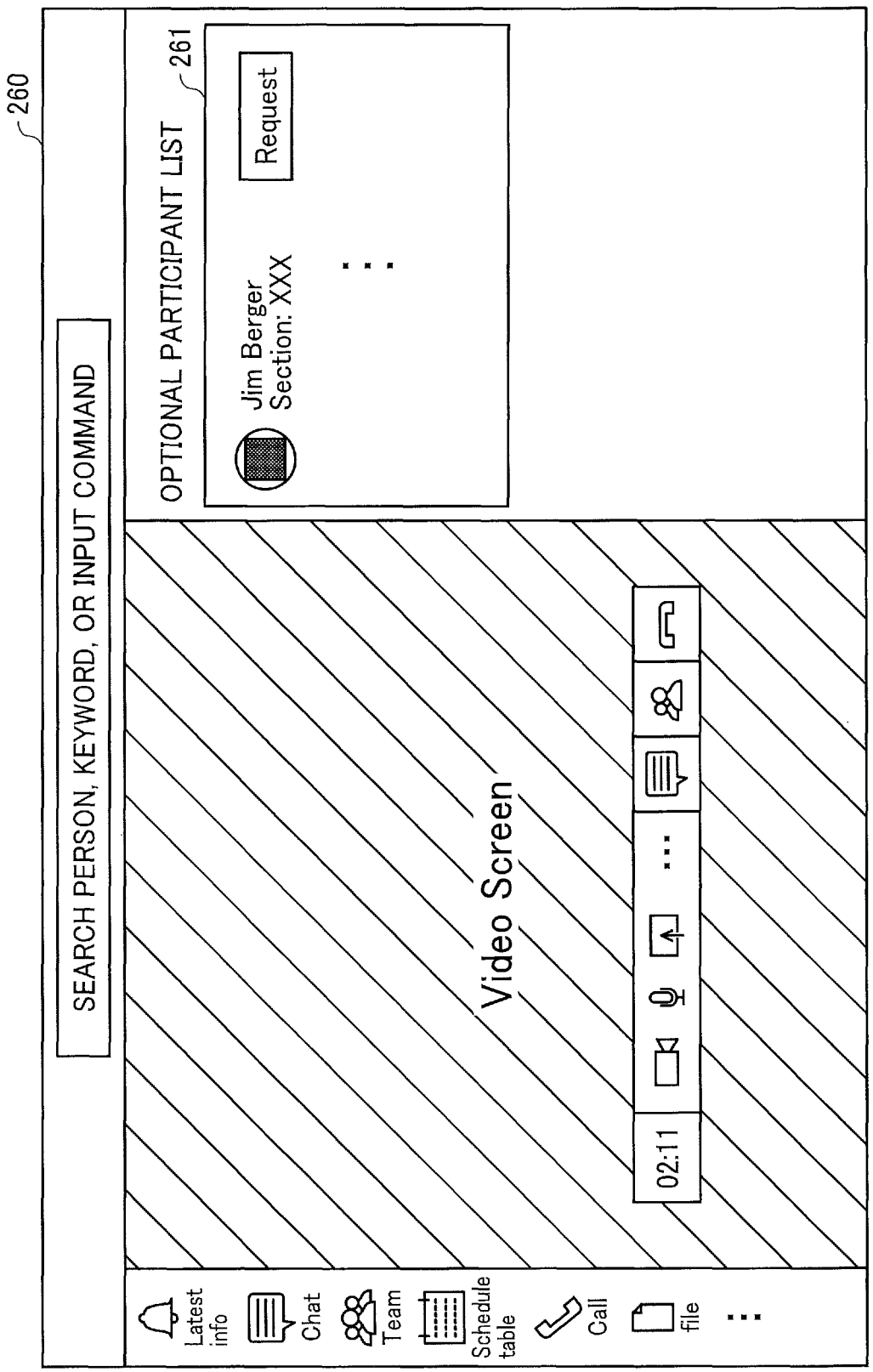
FIG. 38 is an example of online meeting screen.

In view of a situation that a participation of the particular user is to be required during the online meeting in consideration of discussion of the online meeting, for example, an appointment function for optional participant is provided on an online meeting screen 260 as illustrated in FIG. 38.

FIG. 38 is an example of the online meeting screen 260. As illustrated in FIG. 38, the online meeting screen 260 displays an optional participant list 261, and a "request" button provided for each optional participant. If the optional participant list 261 displays an optional participant who is requested to be participated the online meeting, the participant already participating the online meeting presses the "request" button. In response receiving an operation of pressing the "request" button from the participant already participating the online meeting, the request unit 55 of the user terminal 40 transmits, to the sharing assistant server 11, a participation request of the optional participant to the online meeting, in which the optional participant corresponds to the pressed "request" button.

Figure 39:
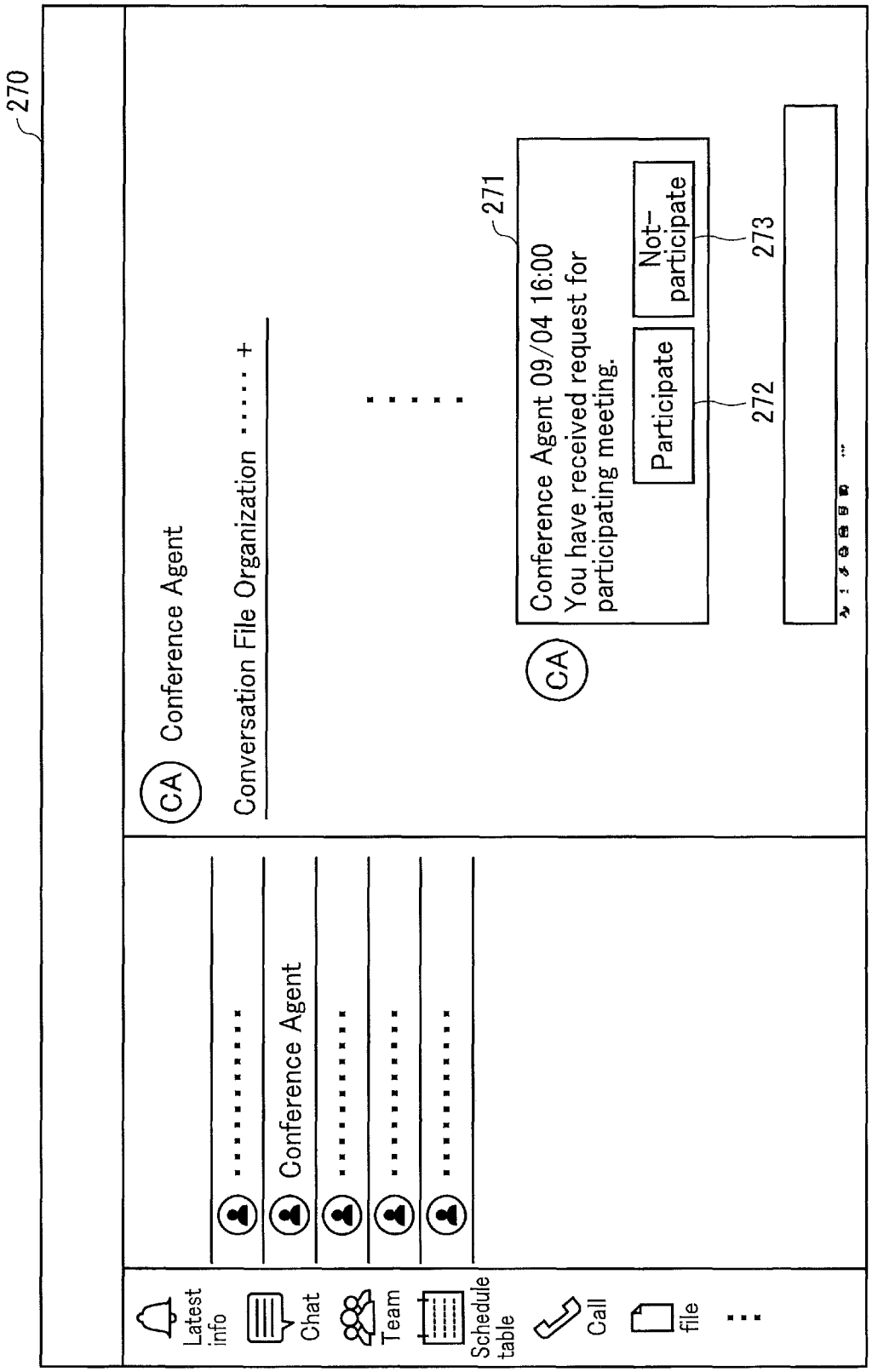
FIG. 39 is an example of chat screen.

Then, the sharing assistant server 11 uses a chat function or the like to request the optional participant to participate the online meeting. When the user terminal 40 used by the optional participant receives the participation request to the online meeting, the user terminal 40 used by the optional participant displays a notification 271 on a chat screen 270 as illustrated in of FIG. 39. The notification 271 is provided with a "participate" button 272 used for participating the online meeting to which the participation request has been made, and a "not-participate" button 273 used for not participating the online meeting. FIG. 39 is an example of the chat screen 270.

Then, by pressing the "participate" button 272, the optional participant can smoothly connect to and participate the online participant, to whom the participation request has been made.

Figure 40:
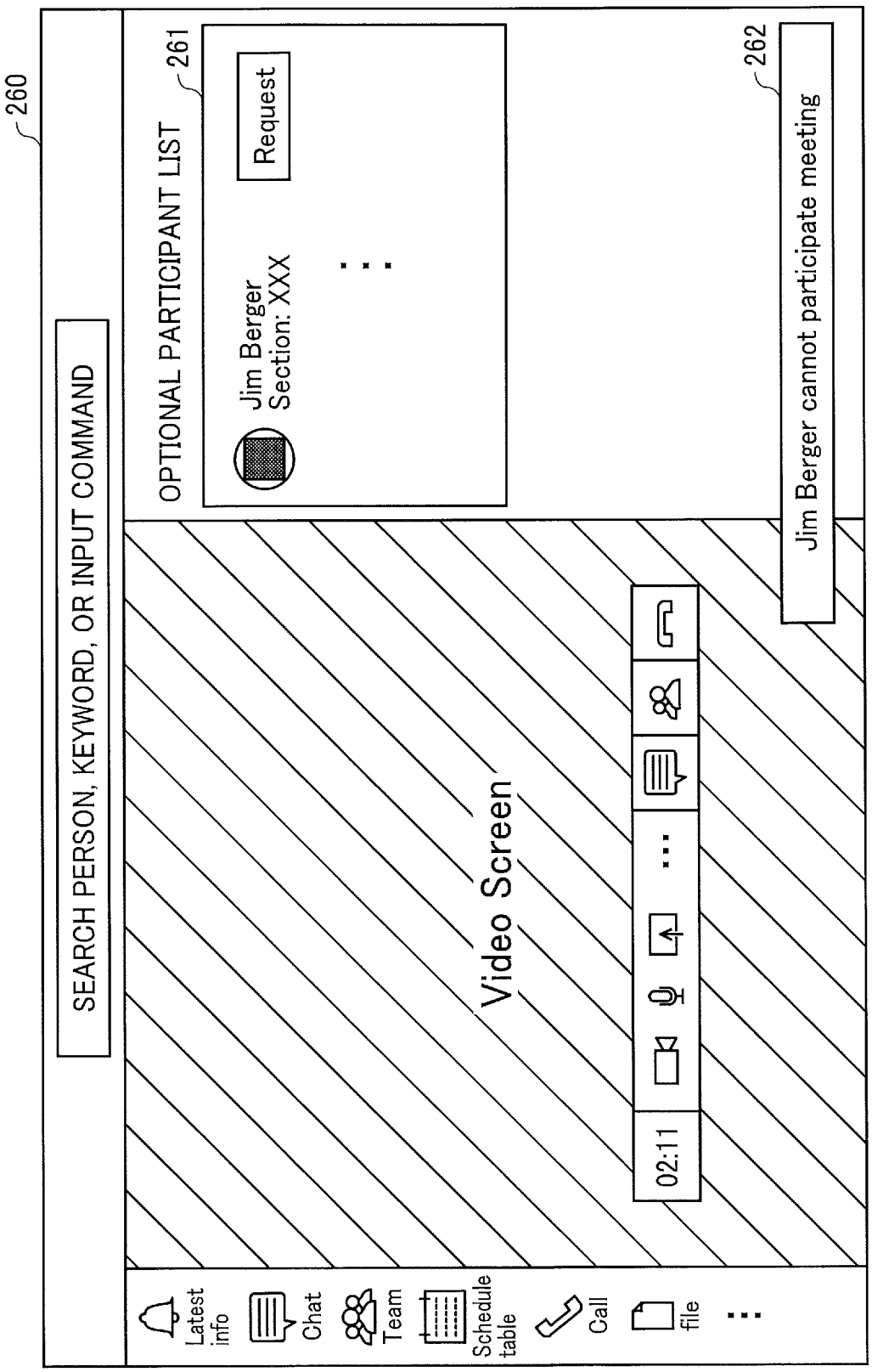
FIG. 40 is an example of online meeting screen.

Further, by pressing the "not-participate" button 273 when the participant cannot participate the online meeting due to some reasons, the optional participant can transmit, for example, a not-participate notification 262 to the user terminal 40 used by each participant of the online meeting, and then the user terminal 40 used by each participant of the online meeting can display the not-participate notification 262 on the online meeting screen 260 as illustrated in FIG. 40. FIG. 40 is an example of the online meeting screen 260.

As to the above described embodiment, an event registration system capable of assisting or supporting registration of participation candidates for an event can be provided.

The above described embodiment is also implemented a management system for managing organization information connectable to a user terminal via a network. The management system includes circuitry configured to display, on a display, a particular participation candidate of a particular event identified based on an input from the user terminal, and a particular person based on particular organization information of a particular organization to which the particular participation candidate belongs.

The above described embodiment is also implemented as a method of processing information performable by a user terminal connectable to a management system for managing organization information via a network. The method includes displaying, on a display, a particular participation candidate of a particular event identified based on an input to the user terminal, and a particular person based on the particular participation candidate and particular organization information of a particular organization to which the particular participation candidate belongs.

The above described embodiment is also implemented as a method of processing information performable by a management system for managing organization information, connectable to a user terminal via a network. The method includes displaying, on a display, a particular participation candidate of a particular event identified based on an input from the user terminal, and a particular person based on particular organization information of a particular organization to which the particular participation candidate belongs.

The above described embodiment is also implemented as a non-transitory computer readable storage medium storing one or more instructions that, when executed by one or more processors, cause the one or more processors to perform a method of processing information performable by a management system for managing organization information, connectable to a user terminal via a network. The method includes displaying, on a display, a particular participation candidate of a particular event identified based on an input from the user terminal, and a particular person based on particular organization information of a particular organization to which the particular participation candidate belongs.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above. The information processing system 1 described in the above described embodiment are just one example, and there are various system configurations depending on applications and purposes.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The group of apparatuses or devices described in the above embodiment only represents one of a plurality of computing environments for implementing the embodiment disclosed herein.

In one embodiment, the sharing assistant server 11 and the schedule management server 12 may include a plurality of computing devices, such as server clusters. The plurality of computing devices are configured to communicate with each other over any type of communication link, including the communication network 50, shared memory, or the like, to perform the processing disclosed herein.

Further, the sharing assistant server 11, the schedule management server 12, the voice-to-text conversion server 13, the action item management server 14, and the user terminal 40 can be configured to share the processing steps disclosed herein in various combinations. For example, a process performable by a given unit may be performable by other unit. Similarly, the function performable by a given unit may be performable by other unit. Further, each of the functional units of the sharing assistant server 11, the schedule management server 12, the voice-to-text conversion server 13, and the action item management server 14 may be integrated into one apparatus or may be divided into a plurality of apparatuses.

The collaboration system 10 is an example of collaboration work assistant or supporting system. The term management unit 84 is an example of term management unit. The display 506 is an example of display unit. The keyword of participation candidate management table is an example of term information. The term information is information about a term used by each member or organization that is a participation candidate in an event. For example, if terms are used by the patent headquarters or members belonging to the patent headquarters, the terms can be "patent search" and "application", and if terms are used by the research and development headquarters or members belonging to the research and development headquarters, the terms can be "deep learning" and "machine learning". Further, the user name, organization ID, and organization leader associated with the keyword in the participation candidate management table are examples of participation candidate information for an event, and participant candidate information.

What is claimed is:

1. An event registration system comprising:
   a user terminal;
   a storage to store organization information on one or more organizations; and
   circuitry configured to:
   search a particular participation candidate based on an input from the user terminal;
   search a candidate organization based on particular organization information of an organization to which the particular participation candidate belongs; and
   display, on a display:
   the particular participation candidate of a particular event identified based on the input from the user terminal;
   the candidate organization to which the particular participation candidate belongs; and
   a particular person, other than the particular participation candidate, based on the particular organization information of the candidate organization to which the particular participation candidate belongs,
   wherein the circuitry is further configured to
   identify users of events based on a matching level of voice data included in audio data of the events and sample voice data of each of the users;
   generate the organization information by registering a keyword detected or extracted from text data converted from the audio data of the events, the users who speak or input the keyword, organizations of the users, and leaders of the organizations in association with each other in the storage;
   search the particular participation candidate within the organization information based on the input from the user terminal; and
   search the candidate organization within the organization information based on the particular organization information of the organization to which the particular participation candidate belongs.

2. The event registration system according to claim 1,
   wherein the circuitry is further configured to
   receive an input of information for registering the particular event from the user terminal,
   search the particular participation candidate who is to participate in the particular event based on the received information, and
   display, on the display, in addition to the searched particular participation candidate, the particular person based on the particular organization information of the particular organization to which the particular participation candidate belongs.

3. The event registration system according to claim 2,
   wherein the storage further stores expertise information of one or more users, and the circuitry searches the particular participation candidate who is to participate the particular event based on the received information and the expertise information of one or more users.

4. The event registration system according to claim 1,
   wherein the circuitry is configured to request the particular participation candidate and the particular person based on the particular organization information of the particular organization to which the particular participation candidate belongs to send a response of whether or not the particular participation candidate can participate the particular event.

5. The event registration system according to claim 2,
   wherein the circuitry is configured to associate term information based on data shared in one or more events, to which a plurality of users have participated, and identification information of the plurality of users, and to store, in the storage, the term information associated with the identification information of the plurality of users as participation candidate information for the particular event, and
   wherein the circuitry is configured to use the identification information of the plurality of users associated with the term information, corresponding to a keyword received from the user terminal, to search the particular participation candidate who is to participate the particular event.

6. The event registration system according to claim 5,
   wherein the circuitry is configured to store, in the storage, the term information including at least one of text data converted from voice data of the plurality of users, text data input by the plurality of users, and text data recognized from image data of a screen shared in the particular event in association with the identification information of the plurality of users as the participation candidate information for the particular event.

7. A user terminal connectable to a management system for managing organization information via a network, the user terminal comprising:

circuitry configured to:
    search a particular participation candidate information based on an input from the user terminal;
    search a candidate organization based on particular organization information of an organization to which the particular participation candidate belongs; and
    display, on a display:
        the particular participation candidate of a particular event identified based on the input to the user terminal;
        the candidate organization to which the particular participation candidate belongs; and
    a particular person, other than the particular participation candidate, based on the particular organization information of the candidate organization to which the particular participation candidate belongs,
    wherein the circuitry is further configured to
        identify users of events based on a matching level of voice data included in audio data of the events and sample voice data of each of the users;
        generate the organization information by registering a keyword detected or extracted from text data converted from the audio data of the events, the users who speak or input the keyword, organizations of the users, and leaders of the organizations in association with each other in the storage;
        search the particular participation candidate within the organization information based on the input from the user terminal; and
        search the candidate organization within the organization information based on the particular organization information of the organization to which the particular participation candidate belongs.

8. A non-transitory computer readable storage medium storing one or more instructions that, when executed by one or more processors, cause the one or more processors to perform a method of processing information, the method comprising:
    searching a particular participation candidate based on an input from a user terminal;
    searching a candidate organization based on particular organization information of an organization to which the particular participation candidate belongs;
    displaying, on a display:
        the particular participation candidate of a particular event identified based on the input to a user terminal,
        the candidate organization to which the particular participation candidate belongs, and
        a particular person, other than the particular participation candidate, based on the particular organization information of the candidate organization to which the particular participation candidate belongs, the user terminal being connectable to a management system for managing organization information via a network,
    wherein the method further comprises:
        identifying users of events based on a matching level of voice data included in audio data of the events and sample voice data of each of the users;
        generating the organization information by registering a keyword detected or extracted from text data converted from the audio data of the events, the users who speak or input the keyword, organizations of the users, and leaders of the organizations in association with each other in the storage;
        searching the particular participation candidate within the organization information based on the input from the user terminal; and
        searching the candidate organization within the organization information based on the particular organization information of the organization to which the particular participation candidate belongs.

9. The event registration system according to claim 1,
wherein the circuitry is further configured to transmit, to a schedule management server, schedule information including at least the particular participation candidate, the particular person and the particular event and control the schedule management server to register the schedule information.

10. The event registration system according to claim 9,
wherein the circuitry is configured to simultaneously display the particular participation candidate and the particular person on the display so as to be selected.

11. The event registration system according to claim 1, wherein the circuitry is further configured to search the particular participation candidate within the organization information based on the number of times of speaking or inputting the keyword or word that partially match the keyword that is input by the user terminal.

12. The event registration system according to claim 11, wherein the circuitry is further configured to multiply the number of times of speaking or inputting the keyword with "1" to obtain a first score point, and multiply the number of times of speaking or inputting a word that partially matches the keywords with "0.8" to obtain a second score point, and then calculates a total sum of score point for each user by adding the first score point and second score point, thereby searching the particular participation candidate.

* * * * *